United States Patent [19]
Terane

[11] Patent Number: 5,991,446
[45] Date of Patent: Nov. 23, 1999

[54] IMAGE CONVERSION DEVICE

[75] Inventor: Hideyuki Terane, Hyogo, Japan

[73] Assignees: Mitsubishi Electric Semiconductor Software Corporation, Itami, Japan; Mitsubishi Denki Kabushiki Kaisha, Tokyo, Japan

[21] Appl. No.: 08/891,066

[22] Filed: Jul. 10, 1997

Related U.S. Application Data

[63] Continuation of application No. 08/404,296, Mar. 14, 1995, abandoned.

[30] Foreign Application Priority Data

Mar. 24, 1994 [JP] Japan ..................................... 6-053616

[51] Int. Cl.⁶ .............................. G06K 9/36; G06K 9/46
[52] U.S. Cl. ............................................ 382/232; 382/234
[58] Field of Search .................................... 382/234, 304, 382/233, 232, 305; 358/319; 327/115, 141, 152, 145, 296; 375/106, 110, 111

[56] References Cited

U.S. PATENT DOCUMENTS 5,270,714   12/1993   Tanaka et al. ............................ 341/59
5,371,517   12/1994   Izzi et al. ................................ 345/199

*Primary Examiner*—Leo H. Boudreau
*Assistant Examiner*—Bhavesh Mehta
*Attorney, Agent, or Firm*—Oblon, Spivak, McClelland, Maier & Neustadt, P.C.

[57] ABSTRACT

It is an object of the present invention to simultaneously perform input or output of picture signals for a plurality of components. An image data input interface (310) is capable of input of picture signals (Pm) of three components at its maximum. For example, when picture signals (Pm) of three components are inputted, a clock divider (410) supplies a ⅓ divided signal of a clock signal (CLK) to the image data input interface (310) on the basis of a selection signal (SEL). In the image date input interface (310), the picture signals (Pm) of three components are simultaneously inputted in synchronization with the ⅓ divided signal and they are sent out to a discrete cosine transform unit (4) in synchronization with the clock signal (CLK). The component to which the sent picture signals (Pxy) belong sequentially changes for every 8×8 picture elements. It has the effect of simultaneously performing input or output of picture signals for a plurality of components while matching with operation of a coding device unit is maintained.

22 Claims, 16 Drawing Sheets

FIG. 6

RAM

| CEC | WEC | OEC | |
|-----|-----|-----|------|
| L | L | X | INPUT |
| L | H | L | OUTPUT |
| X | X | H | Hi-Z |

X : don't care (ARBITRARY)

IMAGE CONVERSION DEVICE

This application is a Continuation of application Ser. No. 08/404,296, filed on Mar. 14, 1995, now abandoned.

BACKGROUND OF THE INVENTION

1. Field of the Invention

The present invention relates to image conversion devices such as image compression devices, image expansion devices, or combinations thereof.

2. Description of the Background Art

FIG. 16 is a block diagram showing the structure of a conventional image compression device. This image compression device is made to realize image compression based on the so-called "JPEG algorithm" which is proposed by the JPEG (Joint Photographic Expert Group) aiming for normalization of the color still image coding system.

For each of picture elements arranged in a matrix along two directions perpendicular to each other on an image, picture signals Pm (m=0, 1, . . . ) which represent its density, luminance, etc. are sequentially provided as inputs to an image data input interface 3 of this device. A single picture signal Pm is comprised of 8 bits to represent density of a single picture element at 256 gradations. This picture signal Pm is sequentially inputted for every 8 bits to the image date input interface 3 from an external device through an image data input terminal 13 of 8-bit width in synchronization with clock signal CLK which is a periodic pulse train inputted from a clock input terminal 1.

The image data input interface 3 divides the train of the inputted picture signals Pm (m=0, 1, . . . ) for each block where 8×8 (=64) picture elements are arranged in a matrix along the two perpendicular scanning directions on the image and outputs them to a discrete cosine transform unit 4 on the next stage. That is to say, for each block, picture signals Pxy (x, y=0 to 7) representing density of each picture element in that block are sequentially sent from the image data input interface 3 to the discrete cosine transform unit 4 in synchronization with the clock signal CLK.

In the discrete cosine transform unit 4, two-dimensional discrete cosine transform is applied to 64 Pxy (x, y=0 to 7) in synchronization with the clock signal CLK. The 64 discrete cosine transform coefficients (referred to as "DCT coefficient" hereinafter) Suv (u, v=0 to 7) obtained by the discrete cosine transform are sequentially sent from the discrete cosine transform unit 4 to a zig-zag conversion unit 5 on the next stage in synchronization with the clock signal CLK.

In the zig-zag conversion unit 5, the DCT coefficients Suv (u, v=0 to 7) are rearranged from the order along rows and columns of matrix with the arranged DCT coefficients Suv (u, v=0 to 7) into the so-called zig-zag order. The DCT coefficients Sij (i, j=0 to 7) rearranged into the zig-zag order are then sequentially sent to a quantization unit 6 from the zig-zag conversion unit 5 in synchronization with the clock signal CLK.

In the quantization unit 6, the 64 DCT coefficients Sij (i, j=0 to 7) are quantized with step sizes which differ for each coefficient position (values of i, j) using a quantization table 7. That is to say, 64 coefficients Qij (i, j=0 to 7) defining step size of each coefficient position are previously stored in the quantization table 7, and the quantization unit 6 performs division of the DCT coefficient Sij with the coefficient Qij and makes a quotient thereof integer to obtain quantization coefficients Rij (i, j=0 to 7). This processing is performed in synchronization with the clock signal CLK. As a result, the obtained quantization coefficients Rij (i, j=0 to 7) are sent from the quantization unit 6 to a Huffman coding unit 8 on the next stage in synchronization with the clock signal CLK.

In the Huffman coding unit 8, referring to a code table 9, coding based on the Huffman coding system is applied to each of the quantization coefficients Rij (i, j=0 to 7). Information for performing the Huffman coding is previously stored in the code table 9, on the basis of which information the Huffman coding unit 8 converts the quantization coefficients Rij (i, j=0 to 7) into a train of coded signals Hn (n=0, 1. . . ) based on the Huffman coding system. This processing is performed in synchronization with the clock signal CLK. As a result, the coded signals Hn (n=0, 1, . . . ) are sent in synchronization with the clock signal CLK from the Huffman coding unit 8 to an external device such as a storage device for storing the coded signals.

The clock signal CLK is sent to an external device for inputting the picture signals Pm (m=0, 1, . . . ) to the image data input terminal 13 thorough a clock output terminal 11. This synchronizes operation of the external device with the clock signal CLK to enable input of picture signals Pm (m=0, 1, . . . ) to the image date input terminal 13 in synchronization with the clock signal CLK.

In comparison for each block, the signal size of the coded signals Hn (n=0, 1, . . . ) is made smaller than the signal size of the 64 picture signals Pxy (x, y=0 to 7). That is, this device realizes compression of the picture signals.

To reproduce the image, the picture signals must be reversely reconstructed from the coded signals Hn which are compressed picture signals. For this aim, a conventional image expansion device making a pair with the device shown in FIG. 16 is used. FIG. 17 is a block diagram showing structure of this image expansion device.

As shown in FIG.17, the coded signals Hn (n=0, 1, . . . ) are sent in the order of a Huffman decoding unit 28, a non-quantization unit 26, an inverse zig-zag conversion unit 25, an inverse discrete cosine transform unit 24 and an image data output interface 23 in synchronization with the clock signal CLK inputted from the clock input terminal 1. The image date output interface 23—the Huffman decoding unit 28 constituting the image expansion device respectively perform processings reverse to the processings in the image data input interface 3—the Huffman coding unit 8 constituting the image compression device. The code table 9 in the image compression device is referred to in the Huffman decoding unit 28 and the quantization table 7 is referred to in the non-quantization unit 26.

Accordingly, inputted coded signals Hn (n=0, 1, . . . ) are sequentially subjected to processings reverse to those in the image compression device. As a result, reconstructed picture signals Pm (m=0, 1, . . . ) are provided as outputs from the image date output interface 23. However, due to the processing made in the quantization unit 6 of the image compression device, the reconstructed picture signals Pm (m=0, 1,. . . ) are not necessarily completely the same as the picture signals Pm (m=0, 1, . . . ) before compressed, but they have been changed in the range where effective image quality is not degraded. That is to say, the system of image compression and image expansion based on the JPEG algorithm belongs to the category of non-reversible system.

The clock signal CLK is sent out to an external device to which the picture signals Pm (m=0, 1, . . . ) are inputted through the clock output terminal 11. The external device is sequentially supplied with the picture signals Pm (m=0, 1, . . . ) from the image data output interface 23 in synchronization with the clock signal CLK.

As the conventional image compression device and the image expansion device are constituted as described above, both of the input of the picture signals Pm from the external device and the output thereof to the external device must be made in synchronization with the clock signal CLK. Accordingly, if the frequency of the clock signal CLK is high and the speed of processings in the device is high, input and output of the picture signals Pm in the external device must be performed at high speed, too. That is to say, it has been a problem that input interface or output interface of the picture signals Pm provided in the external device must operate at high speed in synchronization with the clock signal CLK.

Furthermore, when simultaneously compressing or expanding picture signals Pm of a plurality of components corresponding to a plurality of color components represented by trichromatic components of the RGB (Red, Green, Blue) calorimetric system, for example, input must be made for each component unit, resulting in a problem that a buffer or the like must be additionally provided outside of the device.

SUMMARY OF THE INVENTION

According to the present invention, an image conversion device for coding a train of picture signals representing an image for each block in the image comprises coding means sequentially receiving the picture signals as inputs in synchronization with a clock signal and converting the picture signals into coded signals in the block unit, dividing means for dividing the clock signal to generate a divided signal having a period longer than that of the clock signal, and interface means sequentially receiving the picture signals as inputs in synchronization with the divided clock signal and sequentially outputting the picture signals to the coding means in synchronization with the clock signal.

According to the present invention, the picture signals are inputted to the interface means from outside in synchronization with the divided clock signal having its period longer than that of the clock signal and the inputted picture signals are inputted to the coding means in synchronization with the clock signal so that they agree with the operation of the coding means. That is to say, the device of the invention operates in matching with an external device having a different speed of output of the picture signals than the processing speed of the coding means.

Preferably, in the image conversion device of the present invention, the interface means simultaneously receives as inputs picture signals belonging to a plurality of components identical in number to a ratio between the period of the divided clock signal and the period of the clock signal in synchronization with the divided clock signal, and it sequentially outputs the picture signals to the coding means in synchronization with the clock signal, with the component to which the outputted picture signal belongs sequentially changed for each of the blocks.

According to the present invention, the picture signals belonging to a plurality of components identical in number to the ratio between the period of the divided clock signals and the period of the clock signal are simultaneously inputted in synchronization with the divided clock signals. The picture signals are outputted to the coding means in synchronization with the clock signal and the component is sequentially changed in a block unit while they are outputted. Accordingly, coding of the picture signals of the respective components is accomplished in the coding means. That is to say, in the device of the invention, picture signals of a plurality of components can be inputted simultaneously while matching with operation of the coding means is maintained.

Preferably, in the image conversion device of the present invention, the dividing means is capable of generating a divided clock signal having a period which is an arbitrary natural number, being not more than a predetermined plural number, times the period of the clock signal, the interface means is capable of simultaneous input of the picture signals belonging to an arbitrary number, being not more than the predetermined plural number, of component(s) in synchronization with the divided clock signal generated by the dividing means, and it sequentially outputs the picture signals to the coding means in synchronization with the clock signal, and the components to which the outputted picture signals belong can be sequentially changed for each of the blocks, the device further comprises control means, and the control means causes the dividing means to selectively generate a divided clock signal according to the number of the component(s) inputted to the interface means, the divided clock signal having a period which is the number of the component(s) times the period of the clock signal.

According to the present invention, the number of components inputted to the interface means is variable, and the dividing means can produce plural kinds of divided clock signals. Furthermore, a divided clock signal corresponding to the number of inputted components is selected by the control means. Accordingly, in the device of the invention, picture signals of an unfixed number of component(s) in a certain range can be inputted simultaneously while maintaining matching with operation of the coding means.

In another aspect of the present invention, an image conversion device for decoding coded signals obtained by coding a train of picture signals representing an image for each block in the image comprises decoding means for converting the coded signals into a train of the picture signals in the block unit in synchronization with the clock signal and sequentially outputting the train of picture signals, dividing means for dividing the clock signal to generate a divided clock signal having a period longer than that of the clock signal, and interface means sequentially receiving as inputs the picture signals from the decoding means in synchronization with the clock signal and sequentially outputting the picture signals in synchronization with the divided clock signal.

According to the device of the present invention, the picture signals obtained by decoded in the decoding means are inputted to the interface means in synchronization with the clock signal. Further, the picture signals are externally outputted from the interface means in synchronization with the divided clock signal having a period longer than that of the clock signal. Accordingly, matching can be obtained with an external device having different speed of input of picture signals than the processing speed of the decoding means.

Preferably, in the image conversion device of the present invention, the interface means sequentially receives the picture signals as inputs from the decoding means in synchronization with the clock signal, portions out the inputted picture signals to a plurality of components identical in number to a ratio between the period of the divided clock signal and the period of the clock signal for each block, and it simultaneously outputs the picture signals belonging to the respective components in synchronization with the divided clock signal.

According to the device of the present invention, while the picture signals are sequentially inputted from the decoding means in synchronization with the clock signal, the inputted picture signals are portioned out for each block to a plurality of components identical in number to the ratio between the period of the divided clock signal and the period of the clock signal, and further, the picture signals belonging to the respective components are simultaneously outputted in synchronization with the divided clock signal. That is, in the device of the invention, decoding of the coded signals into the picture signals of the respective components and simultaneous output of picture signals of the plurality of components can be realized in matching with each other.

Preferably, in the image conversion device of the present invention, the dividing means is capable of generating a divided clock signal having a period which is an arbitrary natural number, being not more than a predetermined plural number, times the period of the clock signal, the interface means sequentially receives the picture signals as inputs from the decoding means in synchronization with the clock signal and it can portion out the inputted picture signals to an arbitrary number, being not more than the predetermined plural number, of component(s) for each of the blocks, and it is also capable of simultaneously outputting the picture signals belonging to the respective components in synchronization with the divided clock signal produced by the dividing means, the device further comprises control means, and the control means causes the dividing means to selectively produce a divided clock signal depending on the number of the component(s) outputted from the interface means, the divided clock signal having a period which is the number of the component(s) times the period of the clock signal.

According to the device of the present invention, the number of components outputted by the interface means is variable, and the dividing means can produce plural kinds of divided clock signals. Furthermore, a divided clock signal corresponding to the number of outputted components is selected by the control means. Accordingly, in the device of the invention, picture signals of an unfixed number of component(s) in a certain range can be outputted simultaneously while maintaining matching with operation of the decoding means.

The present invention is also directed to an image conversion device capable of coding a train of picture signals representing an image for each block in the image and capable of reversely decoding the coded signals into the picture signals. According to the present invention, the image conversion device comprises coding means sequentially receiving the picture signals as inputs in synchronization with a clock signal and converting the picture signals into coded signals in the block unit, dividing means for dividing the clock signal to generate a divided clock signal having a period longer than that of the clock signal, first interface means sequentially receiving the picture signals as inputs in synchronization with the divided clock signal and sequentially outputting the picture signals to the coding means in synchronization with the clock signal, decoding means for converting the coded signals into a train of the picture signals in the block unit in synchronization with the cock signal and sequentially outputting the train of the picture signals, and second interface means sequentially receiving the picture signals as inputs from the decoding means in synchronization with the clock signal and sequentially outputting the picture signals in synchronization with the divided clock signal.

According to the device of the present invention, the picture signals are inputted to the first interface means from outside in synchronization with the divided clock signal with a period longer than that of the clock signal and the inputted picture signals are inputted to the coding means in synchronization with the clock signal so as to agree with operation of the coding means. The picture signals decoded and obtained in the decoding means are inputted to the second interface means in synchronization with the clock signal. Furthermore, the picture signals are outputted to outside from the second interface means in synchronization with the divided clock signal with a period longer than that of the clock signal. That is, the device of the present invention operates in matching with an external device having a different speed of output or input of picture signals than the processing speed of the coding means or the decoding means.

Preferably, in the image conversion device of the present invention, the first interface means simultaneously receives as inputs picture signals belonging to a plurality of components identical in number to a ratio between the period of the divided clock signal and the period of the clock signal in synchronization with the divided clock signal, and sequentially outputs the picture signals to the coding means in synchronization with the clock signal, and it sequentially changes the component to which the outputted picture signals belong for each of the blocks, and the second interface means sequentially receives the picture signals as inputs from the decoding means in synchronization with the clock signal, portions out the inputted picture signals to a plurality of components identical in number to a ratio between the period of the divided clock signal and the period of the clock signal for each of the blocks, and it simultaneously outputs the picture signals belonging to the respective components in synchronization with the divided clock signal.

According to the device of the present invention, while the picture signals belonging to a plurality of components identical in number to the ratio between the period of the divided clock signal and the period of the clock signal are simultaneously inputted in synchronization with the divided clock signal, the picture signals are outputted to the coding means in synchronization with the clock signal and the component is sequentially changed in a block unit while they are outputted. At the same time, while the picture signals are sequentially inputted from the decoding means in synchronization with the clock signal, the inputted picture signals are portioned out for each block to a plurality of components identical in number to the ratio between the period of the divided clock signal and the period of the clock signal, and further, the picture signals belonging to the respective components are simultaneously outputted in synchronization with the divided clock signal. That is, in the device of the invention, coding or decoding in the coding means or the decoding means and simultaneous input or output of picture signals of a plurality of components can be realized in matching with each other.

Preferably, in the image conversion device of the present invention, the dividing means is capable of producing a divided clock signal having a period which is an arbitrary natural number, being not more than a predetermined plural number, times the period of the clock signal, the first interface means is capable of simultaneous input of the picture signals belonging to an arbitrary number, being not more than the predetermined plural number, of component(s) in synchronization with the divided clock signal produced by the dividing means, and it sequentially outputs the picture signals to the coding means in synchronization with the clock signal, and it can sequentially change the component to which the outputted picture signals belong for each of the blocks, the second interface means simultaneously receives the picture signals as inputs from the decoding means in synchronization with the clock signal, and it can portion out the inputted picture signals to an arbitrary number, being not more than the predetermined plural number, of component(s) for each of the blocks, and it can simultaneously output the picture signals belonging to the respective components in synchronization with the divided clock signal produced by the dividing means, the device further comprises control means, and the control means causes the dividing means to selectively produce a divided clock signal according to the number of the component(s) inputted to the first interface means or the number of the component(s) outputted from the second interface means, the divided clock signal having a period which is the number of the component(s) times the period of the clock signal.

According to the device of the present invention, the number of components inputted to the first interface means is variable, and the dividing means can produce plural kinds of divided clock signals. Furthermore, a divided clock signal corresponding to the number of inputted components is selected by the control means. At the same time, the number of components outputted by the second interface means is variable, and the dividing means can produce plural kinds of divided control signals. Furthermore, a divided clock signal corresponding to the number of outputted components is selected by the control means. That is to say, in the device of the invention, picture signals of an unfixed number of component(s) in a certain range can be inputted or outputted simultaneously while maintaining matching with operation of the coding means or the decoding means.

Accordingly, it is an object of the present invention to provide an image conversion device which can perform input or output of picture signals simultaneously for a plurality of components without requiring any buffer additionally provided and which can obtain matching with an external device with different speeds of input or output of picture signals.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a description diagram showing operation of the RAM of the first preferred embodiment of the present invention.

DESCRIPTION OF THE PREFERRED EMBODIMENTS

1. Outline of the Device of the Preferred Embodiment

Before starting a detailed description of the preferred embodiments of the present invention, the outline of the structure of the device of the preferred embodiments and operations thereof will be described.

<1-1. Image Compression Device>

Figure 2:
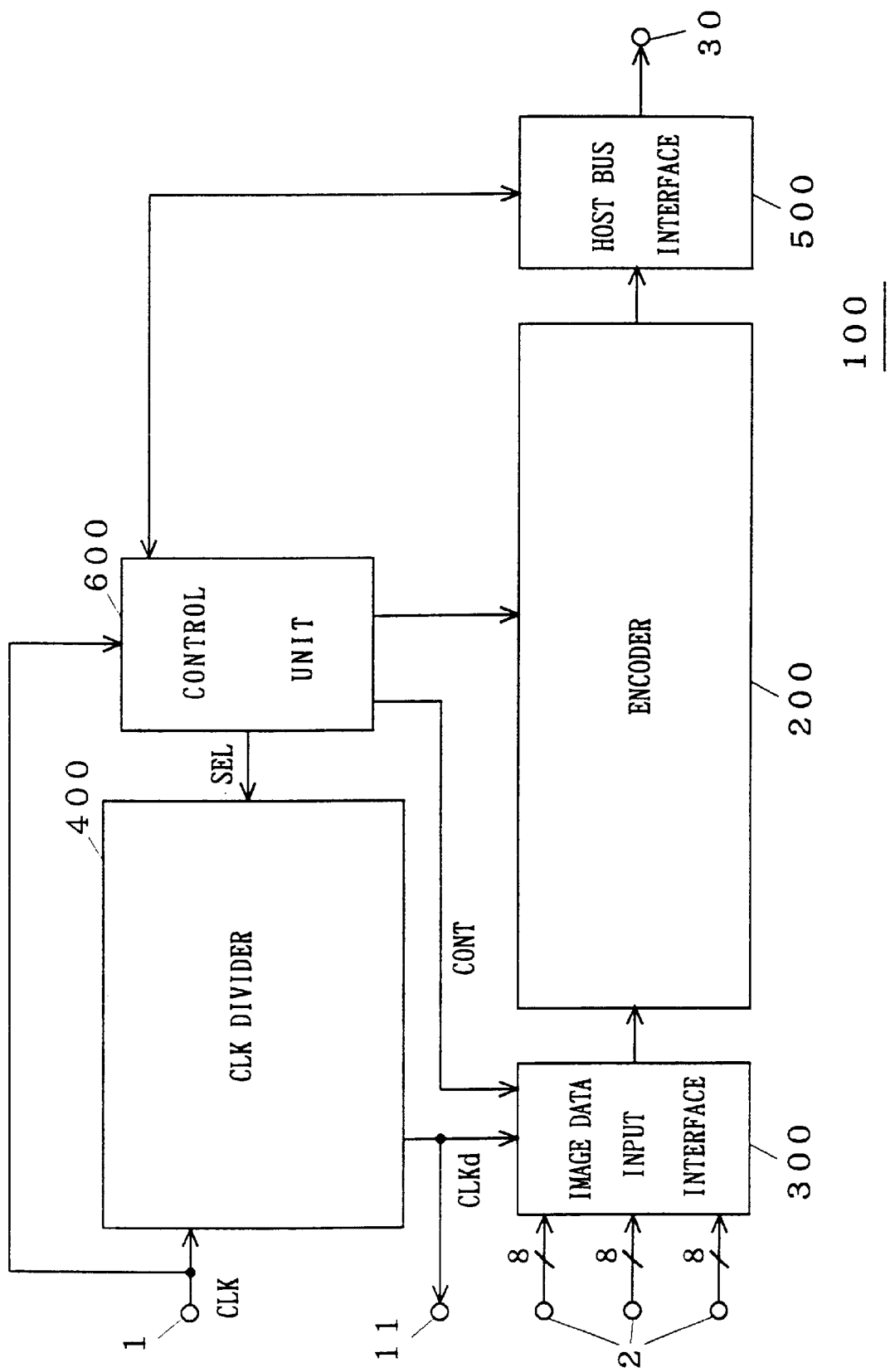
FIG. 2 is a schematic block diagram of an image compression device according to the preferred embodiment of the present invention.

FIG. 2 is a block diagram showing an outline of the structure of an image compression device 100 in the preferred embodiment. Picture signals of three components corresponding to the three components in the RGB (Red, Green, Blue) colorimetric system, for example, are simultaneously inputted to an image data input interface 300 provided in this image compression device 100. Each picture signal is formed of 8 bits to represent density of a single color component at 256 gradations, for example.

Divided clock signal CLKd generated in a clock divider 400 is supplied to the image data input interface 300. This clock divider 400 receives the clock signal CLK which is a periodic pulse train inputted from the clock input terminal 1, divides the signal CLK by ⅓, and provides the obtained divided clock signal CLKd to the image data input interface 300 as an input. That is, a pulse train having a period which is three times that of the clock signal CLK is supplied to the image date input interface 300.

In the image date input interface 300, the inputted picture signals are sequentially inputted to the image data input interface 300 from an external device through an image data input terminal 2 having a width corresponding to 8 bits×3 inputs in synchronization with the divided clock signal CLKd. That is to say, in synchronization with the pulse train with a period three times that of the clock signal CLK, the picture signals corresponding to three components are simultaneously supplied as inputs to the image data input interface 300.

In the image data input interface 300, the train of inputted picture signals corresponding to the three components are respectively divided for each block with 8×8 (=64) picture elements arranged in a matrix along two perpendicular scanning directions on the image, for example, and they are outputted to an encoder (coding unit) 200 on the next stage. This operation is made in synchronization with the clock signal CLK. That is, picture signals which belong to any of the components or any of the blocks are sequentially sent to the encoder 200 from the image data input interface 300 in synchronization with the clock signal CLK, and the component or block to which the sent picture signals belong sequentially changes for every 64 picture signals, for example.

The encoder 200 is configured identically to a device for coding a train of picture signals corresponding to one component in one block unit in synchronization with the clock signal CLK. The coded signals obtained by the encoder 200 are sent out to an external storage device or a host computer etc. connected to an output terminal 30 through a host bus interface 500.

A control unit 600 serves to control operation of respective device units in synchronization with the clock signal CLK. Its most important operation is to send a control signal CONT to make control so that the image date input interface 300 provides the train of picture signals in a predetermined order to the encoder 200 in synchronization with the clock signal CLK, and to send a selection signal SEL to select a division value in the clock divider 400.

The clock divider 400 provides a plurality of divided clock signals CLKd with different division values as outputs on the basis of the selection signal SEL from the control unit 600. The control unit 600 sends the selection signal SEL to the clock divider 400 to adequately select one of the plural kinds of division values depending on the number of components inputted to the image data input interface 300.

That is to say, if the number of components inputted to the image data input interface 300 is 3, the ⅓ division value is selected as stated above, and if the number of the components is 2, a ½ division value is selected, and if the number of the component is 1, the clock signal CLK which is not divided is outputted as a divided clock signal CLKd as it is.

The divided clock signal CLKd is sent through a clock output terminal 11 to the external device connected to the image data input terminal 2. That is done to synchronize the operation of the external device with the divided clock signal CLKd to enable the picture signals to be inputted to the image data input terminal 2 in synchronization with the divided clock signal CLKd.

Coding is performed in the encoder 200 so that the size of the coded signal provided as output from the output terminal 30 to the host computer or the like is smaller than the size of the picture signal inputted to the image data input interface 300 or the encoder 200. That is to say, this device 100 realizes compression of picture signals. Further, as the picture signals are inputted to the image data input interface 300 in synchronization with the divided clock signal CLKd with its period longer than that of the clock signal CLK with which the operation of the encoder 200 is synchronized depending on the number of input components, the picture signals which belong to a plurality of components are inputted at the same time in matching with operation of the encoder 200.

That is to say, picture signals which belong to a plurality of components are inputted simultaneously to the image data input interface 300, and the number of input picture signals per unit time is maintained to be the same as the number of picture signals processed by the encoder 200 per unit time. Accordingly, the picture signals which belong to a plurality of components are inputted to the image data input interface 300 at the same time without wastefully accumulating picture signals in the image data input interface 300, and without producing wasteful quiescent period in the encoder 200.

Furthermore, as the division value of the divided clock signal CLKd is selected depending on the number of input components by operation of the control unit 600 and the clock divider 400, picture signals which belong to desired number of components can be inputted in the range of 1 to 3 components.

<1-2. Image Expansion Device>

Figure 3:
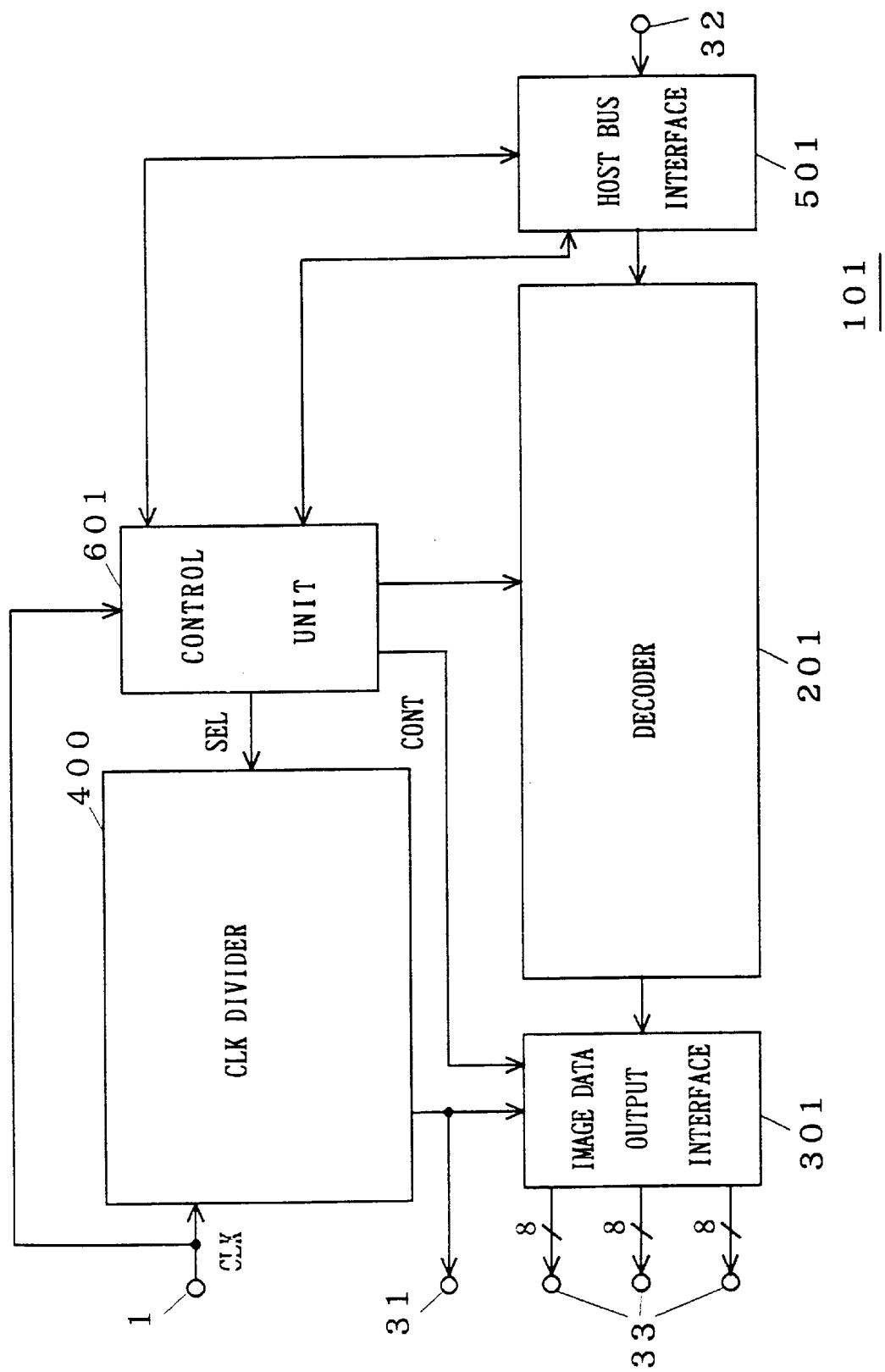
FIG. 3 is a schematic block diagram of an image expansion device according to the preferred embodiment of the present invention.

To reproduce images, picture signals must be reversely reconstructed from the coded signals. An image expansion device which makes a pair with the device shown in FIG. 2 is used for this purpose. FIG. 3 is a block diagram showing outline of the structure of an image expansion device 101 of the preferred embodiment.

As shown in FIG. 3, coded signals are provided as inputs to a decoder (decoding device unit) 201 from the external host computer or the like connected to an input terminal 32 through a host bus interface 501. The decoder 201 reconstructs the coded signals into a train of picture signals in a block unit according to procedure opposite to that of the encoder 200 in synchronization with the clock signal CLK. The reconstructed picture signals are sequentially sent to an image data output interface 301 in synchronization with the clock signal CLK.

The image data output interface 301 portions out the inputted device signals to a plurality of components and simultaneously outputs the picture signals which belong to the respective components in synchronization with the divided block signal CLKd supplied from the clock divider 400. These output picture signals are sent out to the external device through an image data output terminal 33 having a width 8 bits×3 outputs.

The control unit 601 controls operation of each device unit in synchronization with the clock signal CLK, and particularly, it send a control signal CONT to make control so that the image data output interface 301 is supplied with the train of picture signals in a predetermined order from the decoder 201 in synchronization with the clock signal CLK. The control unit 601 also sends out a selection signal SEL for selecting a division value in the clock divider 400.

If the number of components outputted from the image data output interface 301 is 3, the ⅓ division value is selected, and if the number of the components is 2, the ½ division value is selected, and if the number of the component is 1, the clock signal CLK which is not divided is outputted as the divided clock signal CLKd as it is.

The divided clock signal CLKd is sent through a clock output terminal 31 to the external device connected to the image data output terminal 33. This is done to synchronize the operation of the external device with the divided clock signal CLKd to enable the picture signals to be inputted to the external device in synchronization with the divided clock signal CLKd.

As the image expansion device 101 operates as described above, compressed coded signals are reconstructed into picture signals. That is to say, this device 101 realizes expansion of coded signals. Further, as the picture signals are outputted from the image data output interface 301 in synchronization with the divided clock signal CLKd with its period longer than that of the clock signal CLK with which the operation of the decoder 201 is synchronized depending on the number of output components, picture signals which belong to a plurality of components are applied as outputs at the same time in matching with operation of the decoder 201.

That is to say, picture signals which belong to a plurality of components are outputted simultaneously from the image date output interface 301, and the number of output picture signals per unit time is maintained to be the same as the number of picture signals processed by the decoder 201 per unit time. Accordingly, the picture signals which belong to a plurality of components are supplied as outputs from the image data output interface 301 at the same time without wastefully accumulating picture signals in the image data output interface 301, and without producing wasteful quiescent period in the encoder 200.

Furthermore, as the division value of the divided clock signal CLKd is selected depending on the number of output components by operation of the control unit 601 and the clock divider 400, picture signals which belong to desired number of components can be outputted in the range of 1 to 3 components.

<1-3. Combination of Two Devices>

Figure 4:
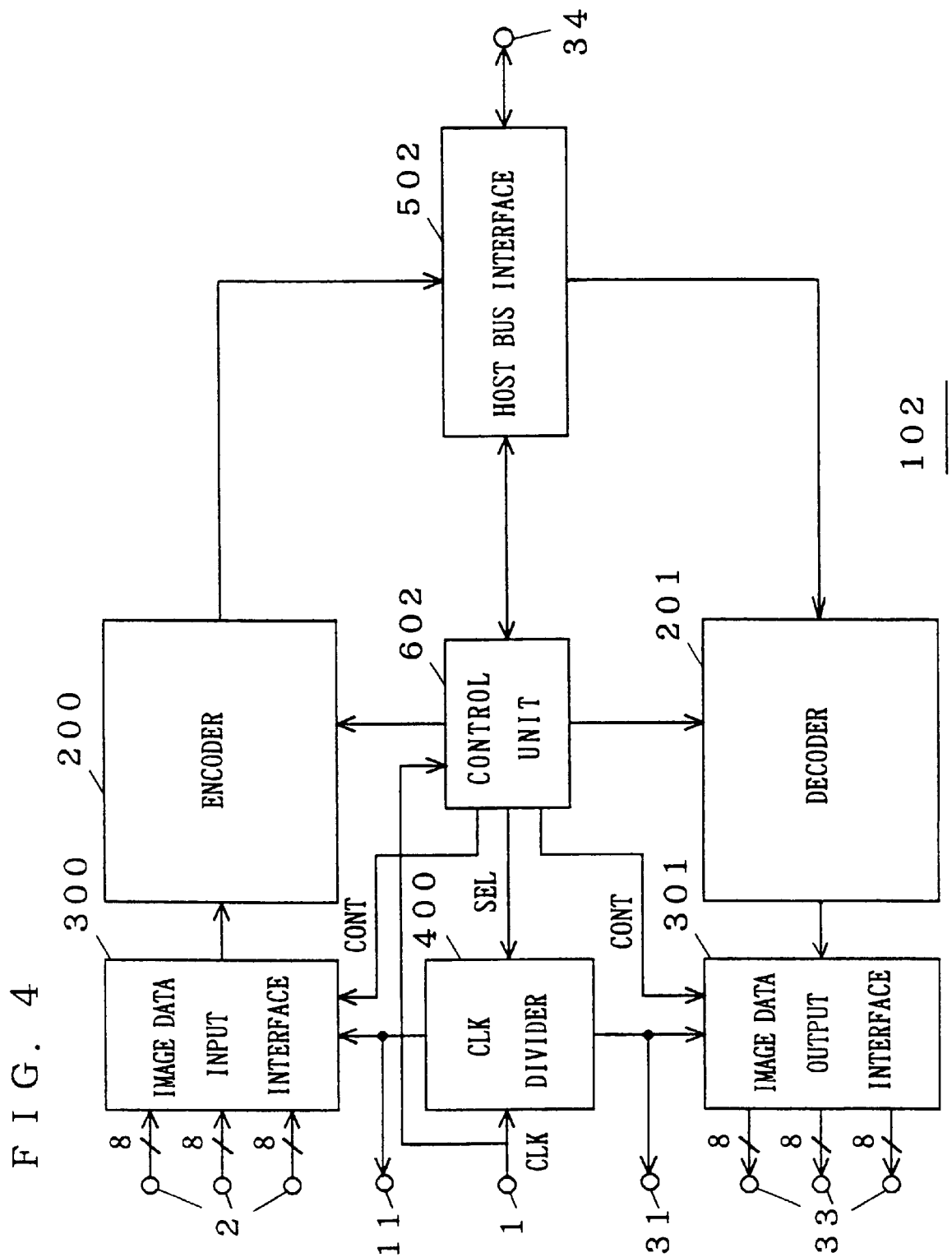
FIG. 4 is a schematic block diagram of an image conversion device according to the preferred embodiment of the present invention.

In normal operation, it is premised that the coded signals are expanded into picture signals when used. Accordingly, in normal use, both of the image compression device and the image expansion device are used. FIG. 4 shows an example of an image conversion device having both functions for this purpose. This image conversion device 102 has both the image compression device 100 and the image expansion device 101. The coded signals are supplied as inputs to or outputs from the external host computer or the like connected to an input/output terminal 34 through a host bus interface 502.

A control unit 602 has both functions of the above-described control unit 600 and the control unit 601. This device 102 can also perform input and output of picture signals for a plurality of components at the same time without any additionally provided buffer.

In the image compression device described above, the maximum number of input components to the image data input interface 300 is 3, but generally the same effect can be produced if it is plural not less than 2. For example, if the maximum number of input components is 4, input of picture signals can be made at the same time for components in the range of 1 to 4. The same is true in the image expansion device.

Further, it is also possible to set the maximum number of input components to the image data input interface 300 to 1 and have the clock divider 400 capable of outputting a plurality of divided clock signals CLKd. In such a device, if the division value of the divided clock signal CLKd is selected to ½, for example, the speed of input of picture signals to the image data input interface 300 can be made two times slower.

At this time, a quiescent period equivalent to operation period occurs in the encoder 200 every time picture signals for one block are processed, but the coding process is normally performed in the operation period. That is to say, it is advantageous in that operation of the external device and operation of the image compression device match each other without requiring an additional interface provided therebetween when the speed of sending out picture signals in the external device connected to the image data input terminal 2 is two times slower than that in the image compression device.

As described above, even if the image data input interface 300 has only one input, matching can be established with an external device with slower processing speed by providing the clock divider 400. The same is true in the image decoding device.

Detailed examples of structures of the image conversion device briefly described above will now be described below.

Figure 16:
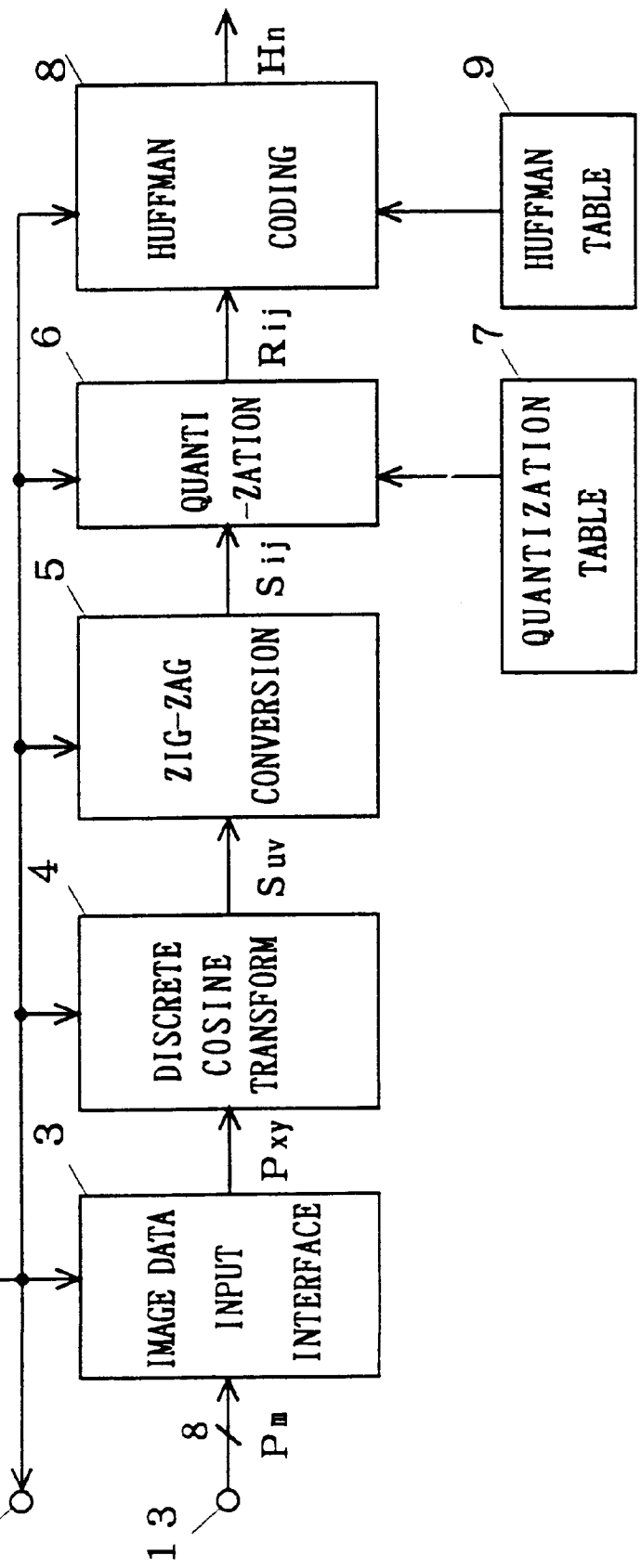
FIG. 16 is a block diagram of a conventional image compression device.
Figure 17:
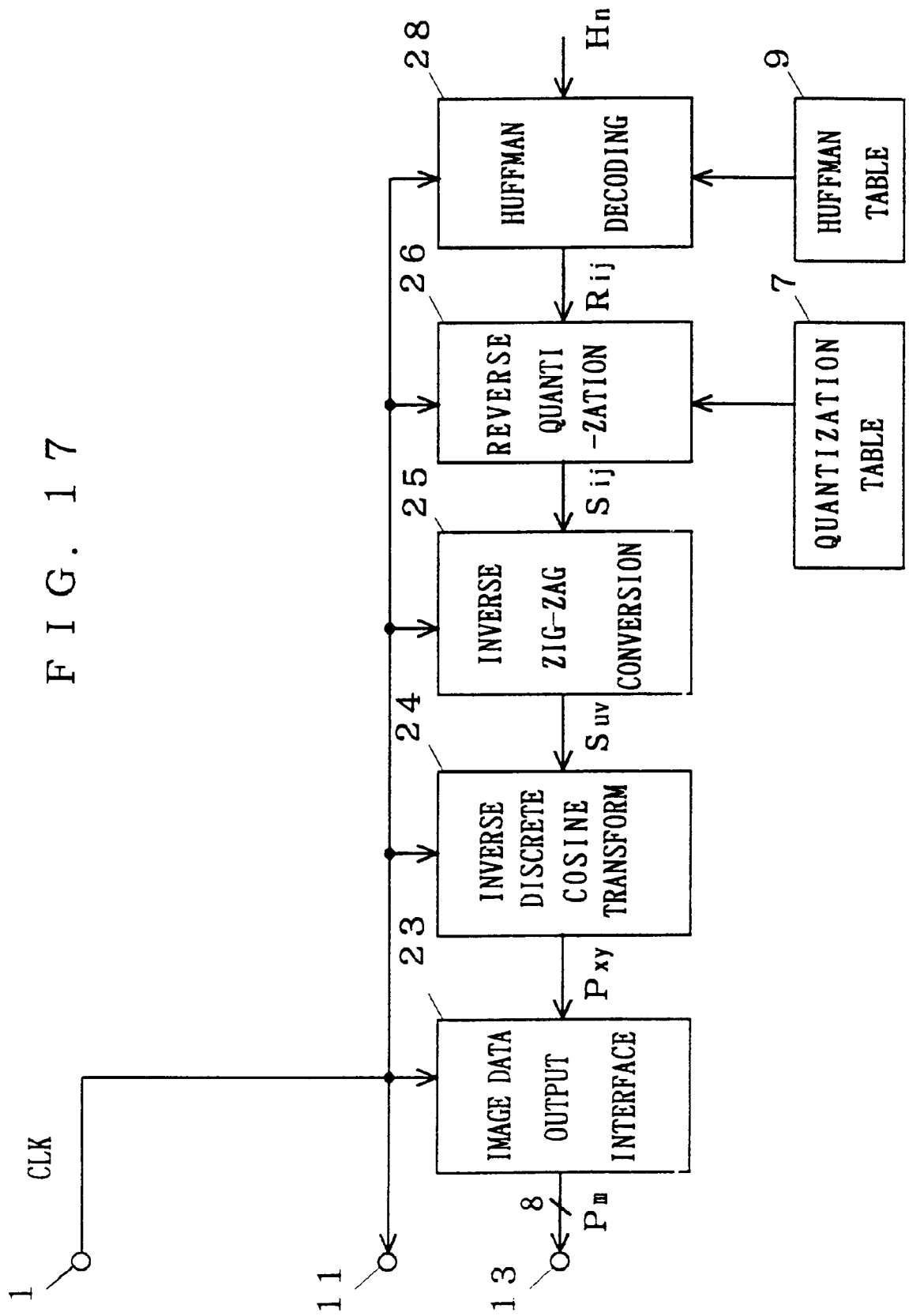
FIG. 17 is a block diagram of a conventional image expansion device.

In the figures newly quoted below, the same portions as those in the conventional devices shown in FIG. 16 and FIG. 17, and the same portions as those in the devices of the preferred embodiment roughly shown in FIGS. 2 thorough 4 are designated at the same reference characters and detailed descriptions thereof are not repeated.

2. First Preferred Embodiment

Figure 1:
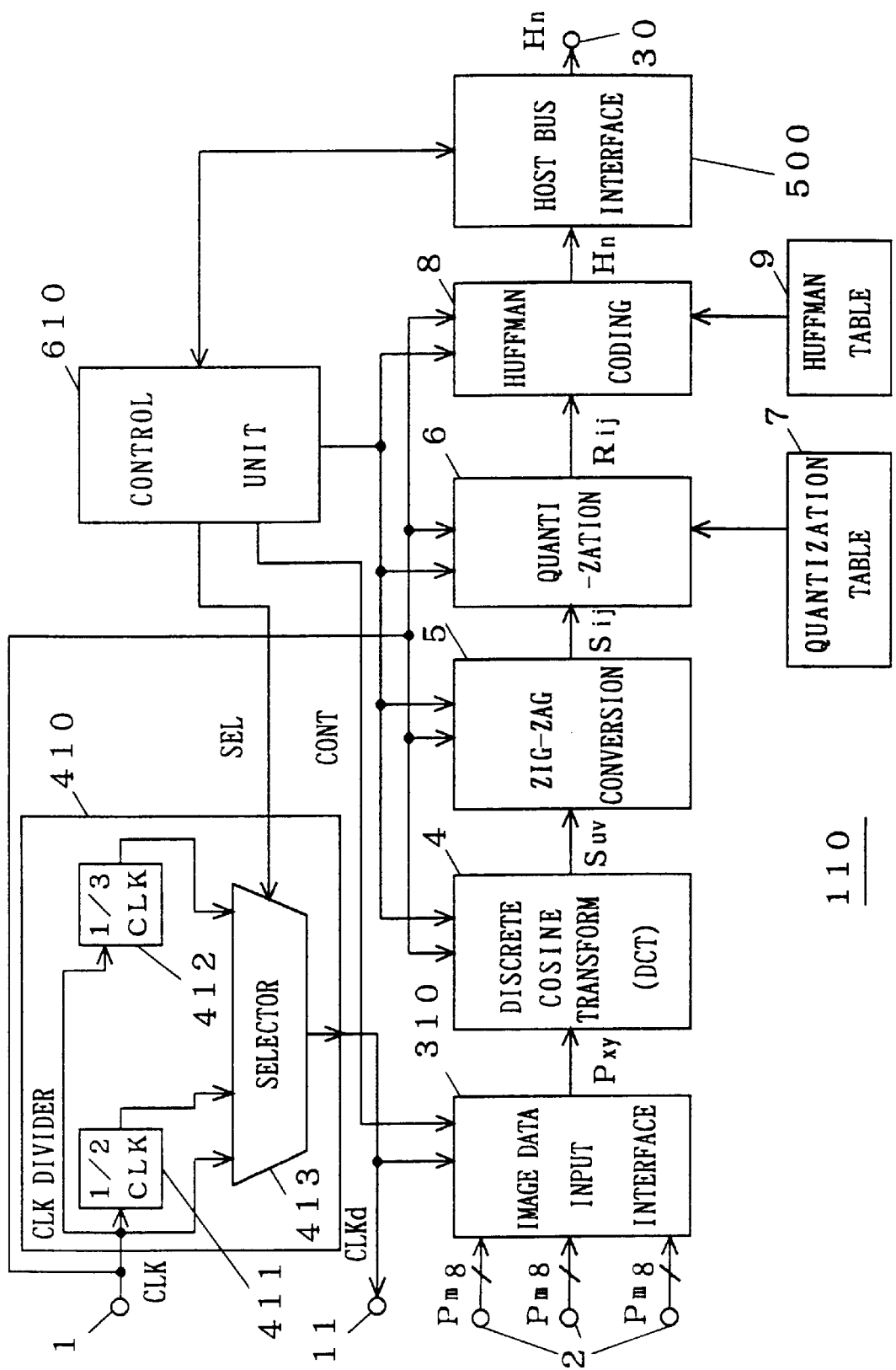
FIG. 1 is a block diagram of an image compression device according to the first preferred embodiment of the present invention.

FIG. 1 is a block diagram showing the structure of an image compression device in this preferred embodiment. In this device 110, the encoder 200 performs the JPEG algorithm in the same way as the conventional device depicted in FIG. 16. An image data input interface 310, a clock divider 410 and a control unit 610 are constructed as examples of the image date input interface 300, the clock divider 400 and the control unit 600 in the image compression device 100, respectively. Accordingly, description on the features in structure and operation discussed on the image compression device 100 are not repeated.

The clock divider 410 has a ½ divider 411 for ½-dividing the clock signal CLK inputted from the clock input terminal 1 and a ⅓ divider 412 for ⅓ dividing the same, where output of each divider is provided as input to a selector 413 together with the clock signal CLK. The selector 413 selects one of these three kinds of clock signals on the basis of the selection signal SEL sent from the control unit 610 and outputs it as a divided clock signal CLKd to the image data input interface 310 and the clock output terminal 11.

Figure 5:
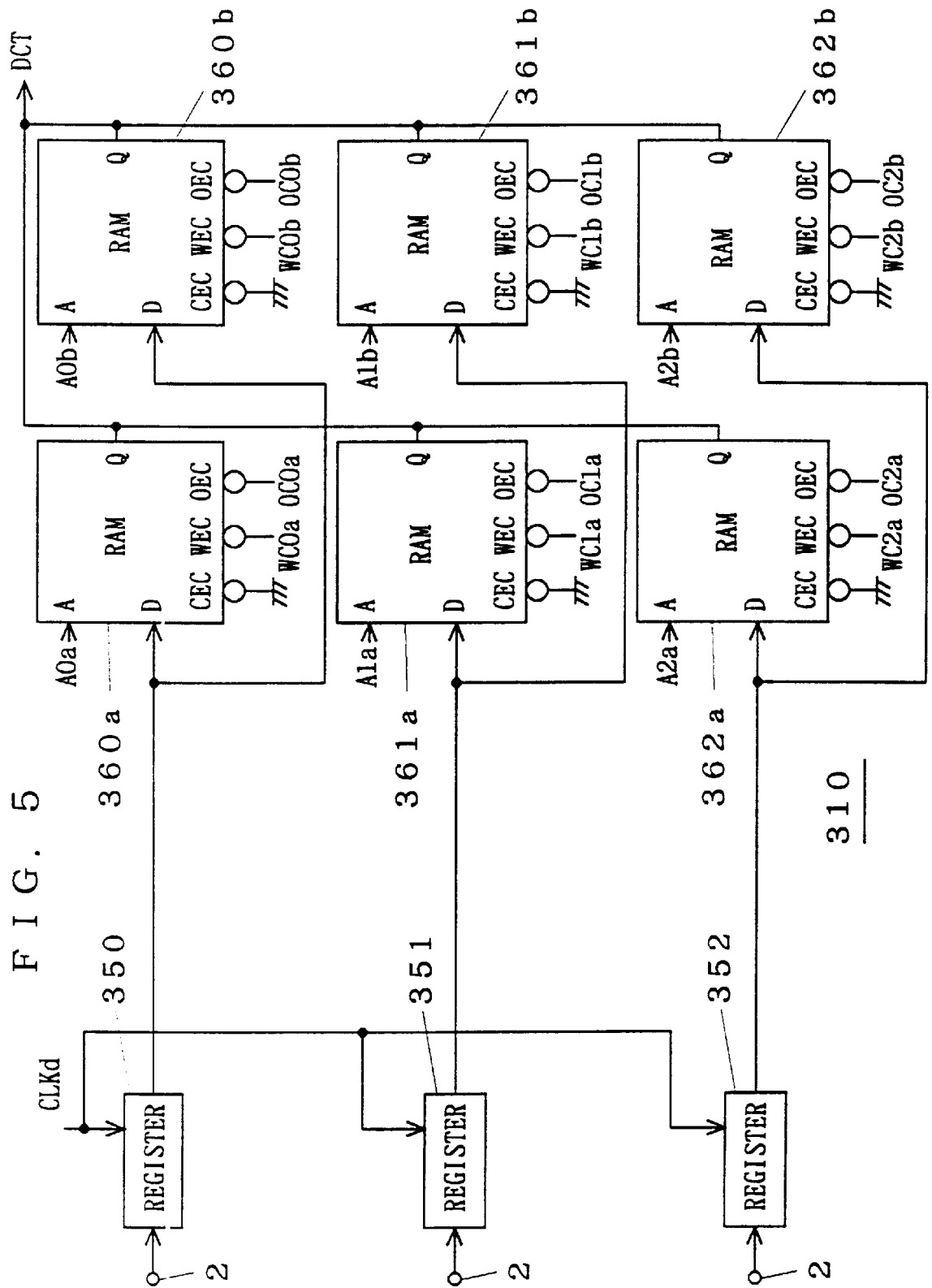
FIG. 5 is a block diagram of the image date input interface of the first preferred embodiment of the present invention.

FIG. 5 shows an internal block diagram of the image data input interface 310. As shown in FIG. 5, the image data input interface 310 is provided with one register and two RAMs for each component. Registers 350, 351 and 352 operate in synchronization with the divided clock signal CLKd to hold the picture signal inputted from the image data input terminal 2.

The picture signals held in the register 350 are portioned out to two RAMs 360a and 360b and stored therein. Similarly, the picture signals held in the register 351 are portioned out to and stored in two RAMs 361a and 361b, and the picture signals held in the register 352 are portioned out to and stored in two RAMs 362a and 362b.

The six RAMs all have common structure and the same memory size. In the RAM 360a, when an active signal (a low level voltage) is inputted to a write permission terminal WEC (when write enable), a picture signal inputted to an input terminal D is stored in a memory address specified by an address signal A0a inputted to an address terminal A. When an active signal (a low level voltage) is inputted to a read permission terminal OEC (when read enable), the picture signal stored in the memory address specified by the address signal A0a inputted to the address terminal A is provided as output from an output terminal Q. The same is true in the remaining five RAMs.

The relation among input signals to the write permission terminal WEC, the read permission terminal OEC and an element selection terminal CEC and operation of the RAM is shown in FIG. 6. In FIG. 6, the character "L" indicates a low level voltage, the character "H" indicates a high level voltage and the character "Hi-Z" indicates that the output terminal Q is at the high impedance. The character "X" indicates that the operation of the RAM does not depend on the level of signal inputted to the terminals. In the image data input interface 310 shown in FIG. 5, the active signal (the low level voltage) is always inputted to the element selection terminal CEC in any of the RAMs.

Referring to FIG. 5 again, address signals (A0a–A2a and A0b–A2b) are input to the six RAMs, write permission signals (WC0a–WC2a and WC0b–WC2b) are input to the write permission terminals WEC and read permission signals (OC0a–OC2a and OC0b–OC2b) are input to the read permission terminals OEC form the control signal CONT output from the control unit 610.

Figure 7:
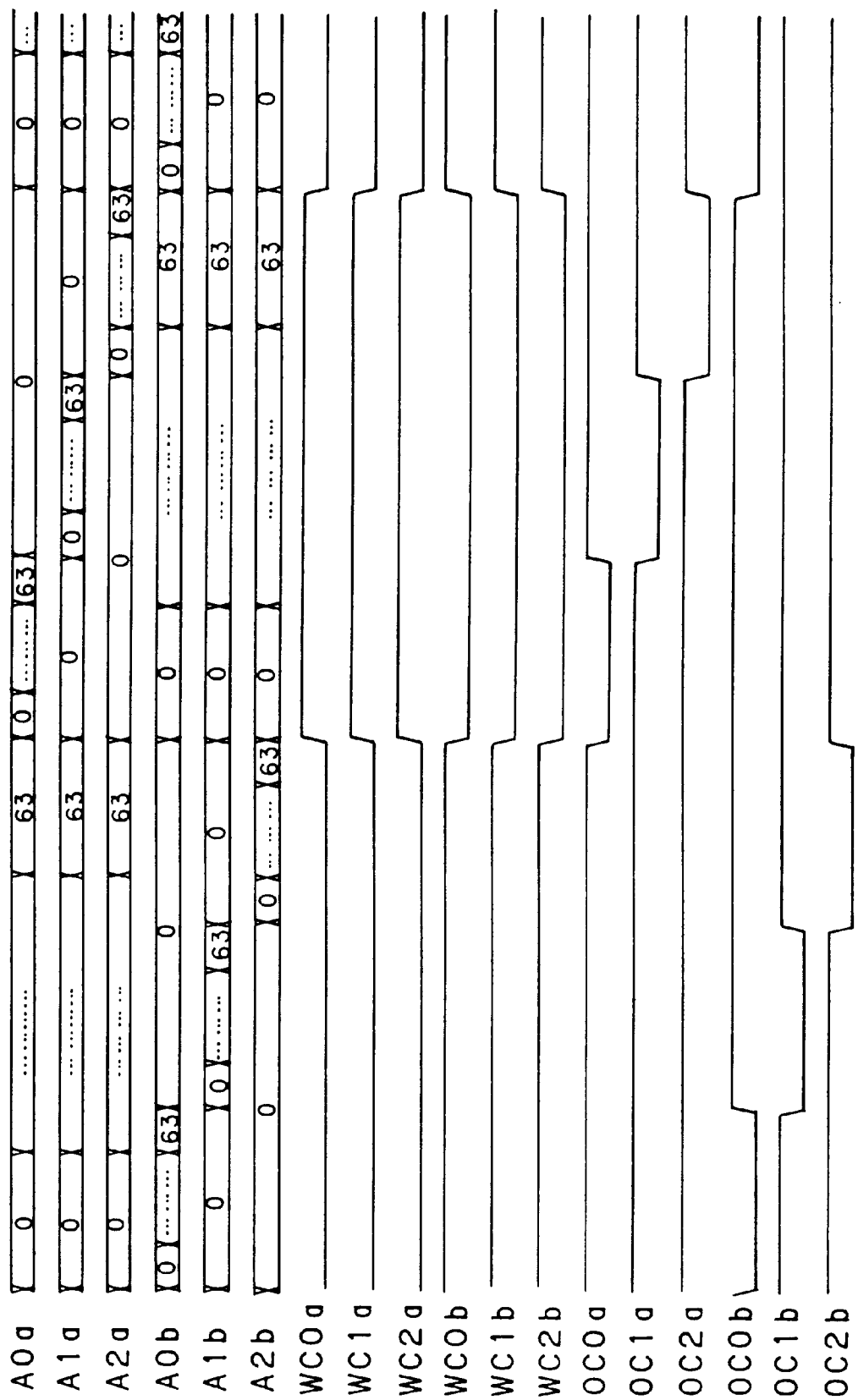
FIG. 7 is a timing chart of the control signals in the image compression device of the first preferred embodiment of the present invention.

FIG. 7 shows a timing chart of these signals forming the control signal CONT. The timing chart of FIG. 7 describes the operation of the present invention when picture signals of three components are input to the image data input interface 310. Also, using the divided clock signal CLKd is obtained by dividing the clock signal CLK by ⅓ using the clock divider 410.

As depicted in FIG. 7, write enable is specified alternately between the three RAMs 360a–362a and other three RAMs 360b–362b for each period in which 64 picture signals constituting one block are inputted (referred to as a "block period" herein), i.e., for every 64 periods of the divided clock signal CLK. That is to say, the picture signals are written alternately in the three RAMs 360a–362a and other three RAMs 360b–362b for each block period.

On the other hand, one of the six RAMs 360a–362a, 360b–362b sequentially attains read enable for each ⅓ block period which is obtained by 3-dividing a block period, i.e., for every 64 period of the clock signal CLK. Furthermore, write enable and read enable are not specified simultaneously in any of the RAMs 360a–362a, 360b–362b. That is to say, one of the six RAMs is sequentially selected for every 64 periods of the clock signal CLK and the picture signal is read out.

When write enable is specified for each RAM 360a–362a, 360b–362b, the address signal changes in synchronization with the divided clock signal CLKd, so that the picture signal is written in synchronization with the divided clock signal CLKd. When read enable is specified, the address signal changes in synchronization with the clock signal CLK, so that the picture signal is read in synchronization with the clock signal CLK.

That is to say, the picture signals are always written into any of the two RAMs sequentially in synchronization with the divided clock signal CLK for each component, and the picture signals are always read in synchronization with the clock signal CLK from any of the six RAMs. Furthermore, in read of the picture signals, the component is changed in a block unit.

As the image data input interface 310 operates as discussed above, picture signals of three components can be inputted simultaneously while matching is maintained with operations of device units constituting the encoder 200 such as the discrete cosine transform unit 4 operating in synchronization with the clock signal CLK. Accordingly, this device 110 is suitable for compression of picture signals of the RGB colorimetric system, for example.

Also, as the control unit 610 and the clock divider 410 work to select the division value of the divided clock signal CLKd depending on the number of input components, picture signals which belong to desired number of components in the range of 1 to 3 components can be simultaneously inputted while matching with operation of each device unit constituting the encoder 200 is maintained. The control signal CONT sent from the control unit 610 differs depending on the number of inputted components. For example, if picture signals of two components are provided as inputted to the two registers 350 and 351, objects of control by the control signal CONT are limited to four RAMs 360a, 361a, 360b and 361b.

In the timing chart of FIG. 7, an example is shown where the specification order to address when the picture signals are written in the RAMs is the same as the specification order when they are read. In this case, in the image data input interface 310, inputted picture signals and outputted picture signals are in the same order. However, the specification order of addresses when the picture signals are written in the RAMs and the specification order when they are read can arbitrarily differ. By doing so, it is possible to input picture signals Pm (m=0, 1, . . . ) in a certain order for each block and output the picture signals Pxy (x, y=0 to 7) to the discrete cosine transform unit 4 in an order which does not necessarily coincide with it.

If the picture signals are not inputted in a block unit, that is, if they are inputted through a plurality of blocks, a buffer can be provided on the input side of the image data input interface 310. This buffer is similarly provided in the image data input interface 3 in the conventional device shown in FIG. 16 when the picture signals Pm are not inputted in a block unit to the image data input interface 3, and it is not a part which is specifically required in this preferred embodiment.

3. Second Preferred Embodiment

Figure 8:
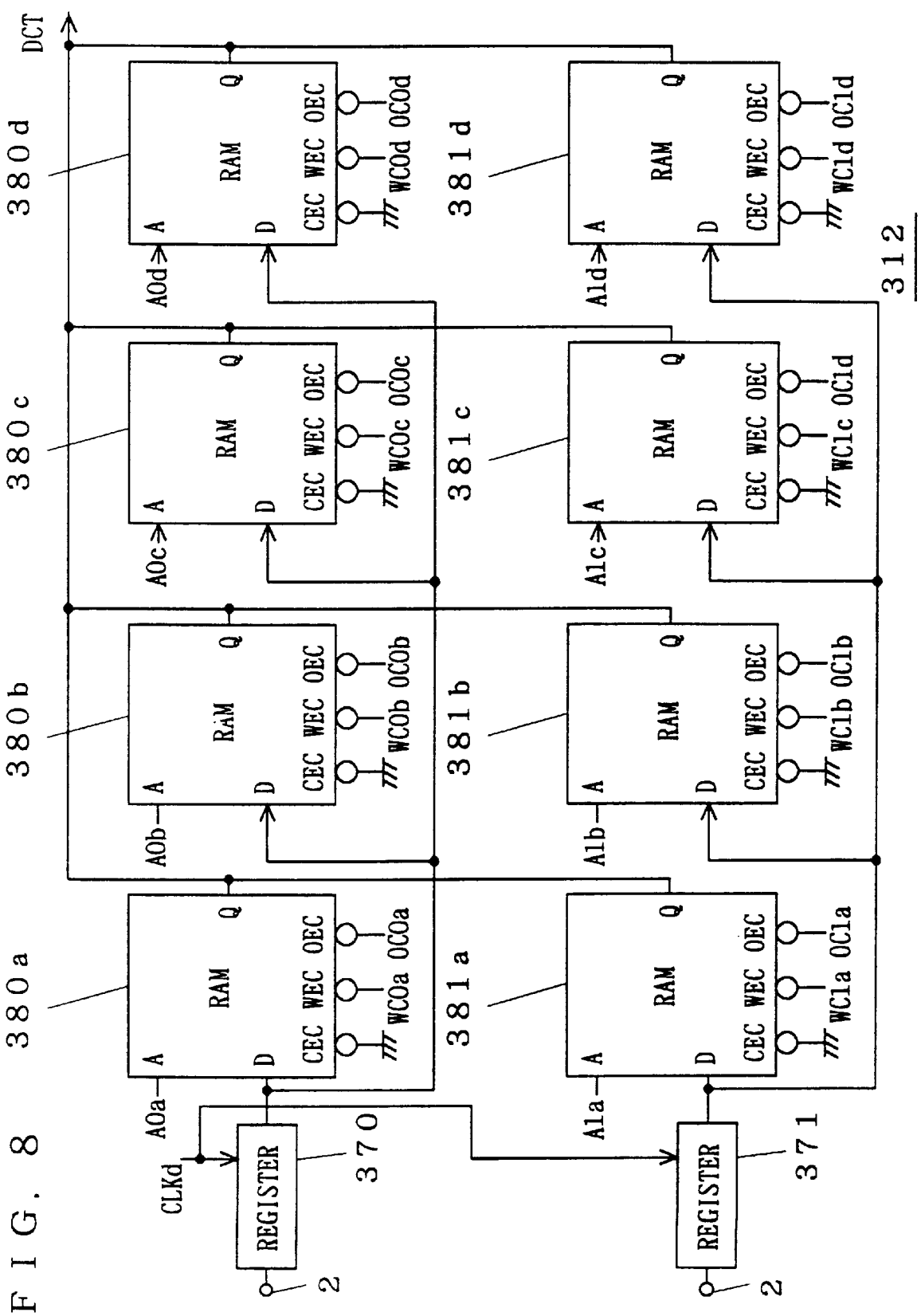
FIG. 8 is a block diagram of an image data input interface according to the second preferred embodiment of the present invention.

FIG. 8 shows the second example of the structure related to the image data input interface 300 (FIG. 2). This image date input interface 312 corresponds to the case where the component ratio, i.e., the ratio of the number of picture elements in each component is 2:1:1. For example, the example of device is suitable for compression of picture signals which represent a luminance component Y and two color-difference components U, V in the YUV (YCrCb) colorimetric system respectively with 8×16 picture elements, 8×8 picture elements and 8×8 picture elements for each block. In the description below, assuming that picture signals of the YUV colorimetric system having such a component ratio are inputted, the structure and operation of the image date input interface 312 will be described.

As depicted in FIG. 8, the image date input interface 312 is provided with one register and four RAMs for the Y component and it is further provided with one register and four RAMs for both the U component and the V component. While the picture signals of the Y component are inputted for one block, i.e., for 8×16 picture elements, one block of the V component (corresponding to 8×8 picture elements) is inputted following one block of the U component (corresponding to 8×8 picture elements).

Registers 370 and 371 operate in synchronization with the divided clock signal CLKd to hold the picture signals inputted from the image date input terminal 2. A divided clock signal CLKd obtained by ½ dividing the clock signal CLK is supplied to the image date input interface 312.

The picture signals of the Y components held in the register 370 are portioned out to and stored in the four RAMs 380a–380d. Similarly, the picture signals of the U component or the V component held in the register 371 are portioned out to and stored in the four RAMs 381a–381d. The eight RAMs have the same structure as that of the RAM 360a shown in FIG. 5, for example, and the memory size is also the same.

Address signals A0a–A0d, A1a–A1d inputted to the eight RAMs, while permission signals WC0a–WC0d, WC1a–WC1d and read permission signals OC0a–OC0d, OC1a–OC1d form the control signal CONT sent from the control unit 600 (FIG. 2).

Figure 9:
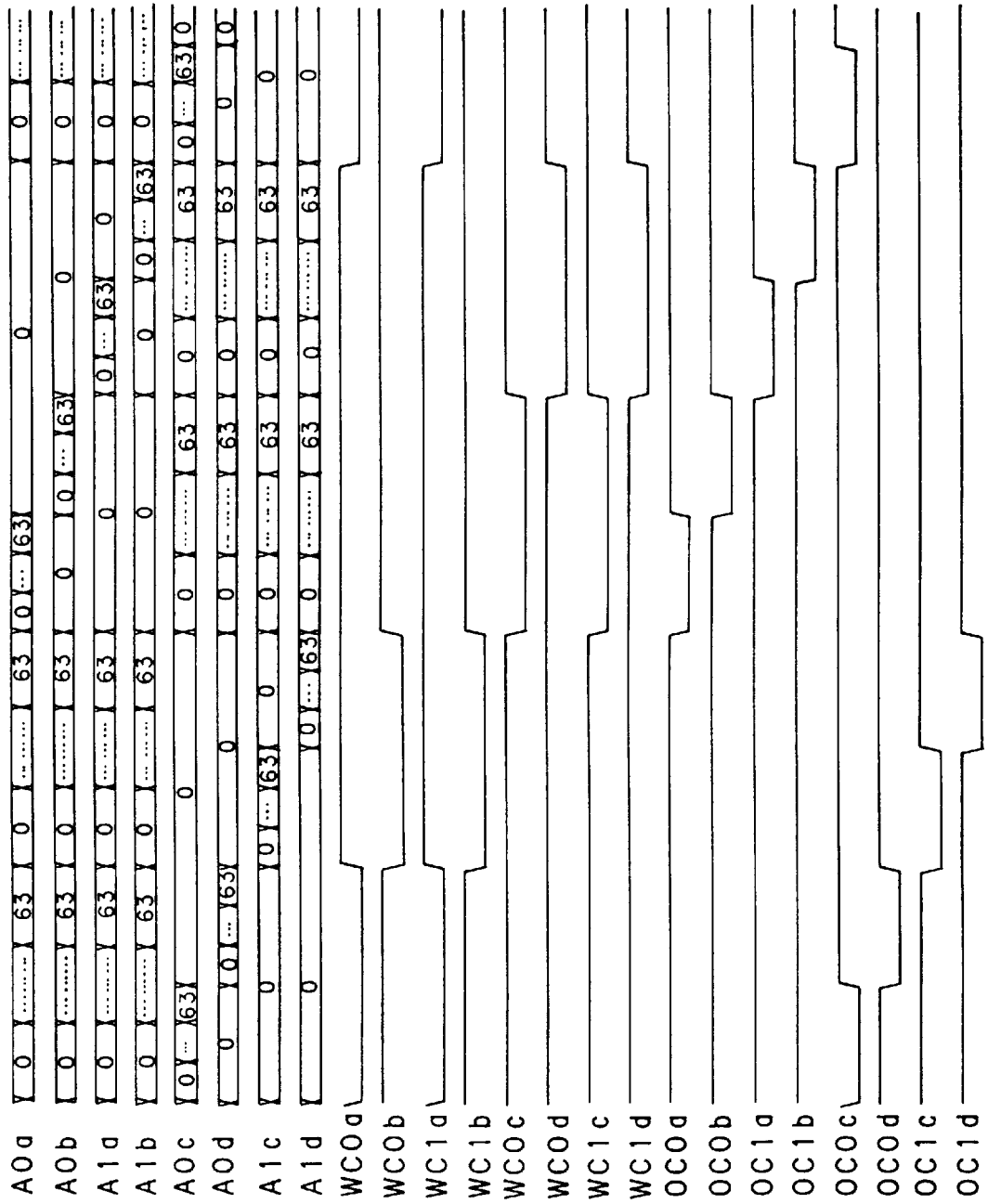
FIG. 9 is a timing chart of the control signals in the image compression device according to the second preferred embodiment of the present invention.

FIG. 9 shows a timing chart of these signals forming the control signal CONT. As depicted in FIG. 9, write enable is specified sequentially among the four RAMs 360a–360d for each period in which 64 picture signals for one block of the U component or the V component are inputted (referred to as a "block period" herein), i.e., for every 64 periods of the divided clock signal CLKd. Accordingly, the picture signal of the Y component are sequentially portioned out and written in the four RAMs 360a–360d for every sixty-four.

Similarly, for each block period, write enable is specified sequentially among the four RAMs 361a–361d. Accordingly, 64 picture signals of the U component and 64 picture elements of the V component are alternately, and sequentially portioned out into the four RAMs 361a–361d, and stored therein.

On the other hand, in reading picture signals, one of the eight RAMs 360a–360d, 361a–361d sequentially attains read enable for each ½ block period which is obtained by 2-dividing a block period, i.e., for every 64 periods of the clock signal CLK. Furthermore, write enable and read enable are not specified simultaneously in any of the RAMs 360a–360d, 361a–361d. That is to say, one of the eight RAMs is sequentially selected for every 64 periods of the clock signal CLK and picture signal is read out.

When write enable is specified for each RAM 360a–360d, 361a–361d, the address signal changes in synchronization with the divided clock signal CLKd, so that the picture signal is written in synchronization with the divided clock signal CLKd. When read enable is specified, the address signal changes in synchronization with the clock signal CLK, so that the picture signal is read in synchronization with the clock signal CLK.

That is to say, the picture signals are always written sequentially into any of the four RAMs in synchronization with the divided clock signal CLKd for each component, and the picture signals are always read in synchronization with the clock signal CLK from any of the eight RAMs.

As the image data input interface 312 operates as discussed above, picture signals which belong to a plurality of components having the component ratio of 2:1:1 can be inputted simultaneously while matching is maintained with operations of device units constituting the encoder 200 such as the discrete cosine transform unit 4 operating in synchronization with the clock signal CLK.

As can be clearly seen from the description above, this image data input interface 312 is also an example of the image date input interface 300 used to compress picture signals of two components in which 8×16 picture elements form one block.

4. Third Preferred Embodiment

Figure 10:
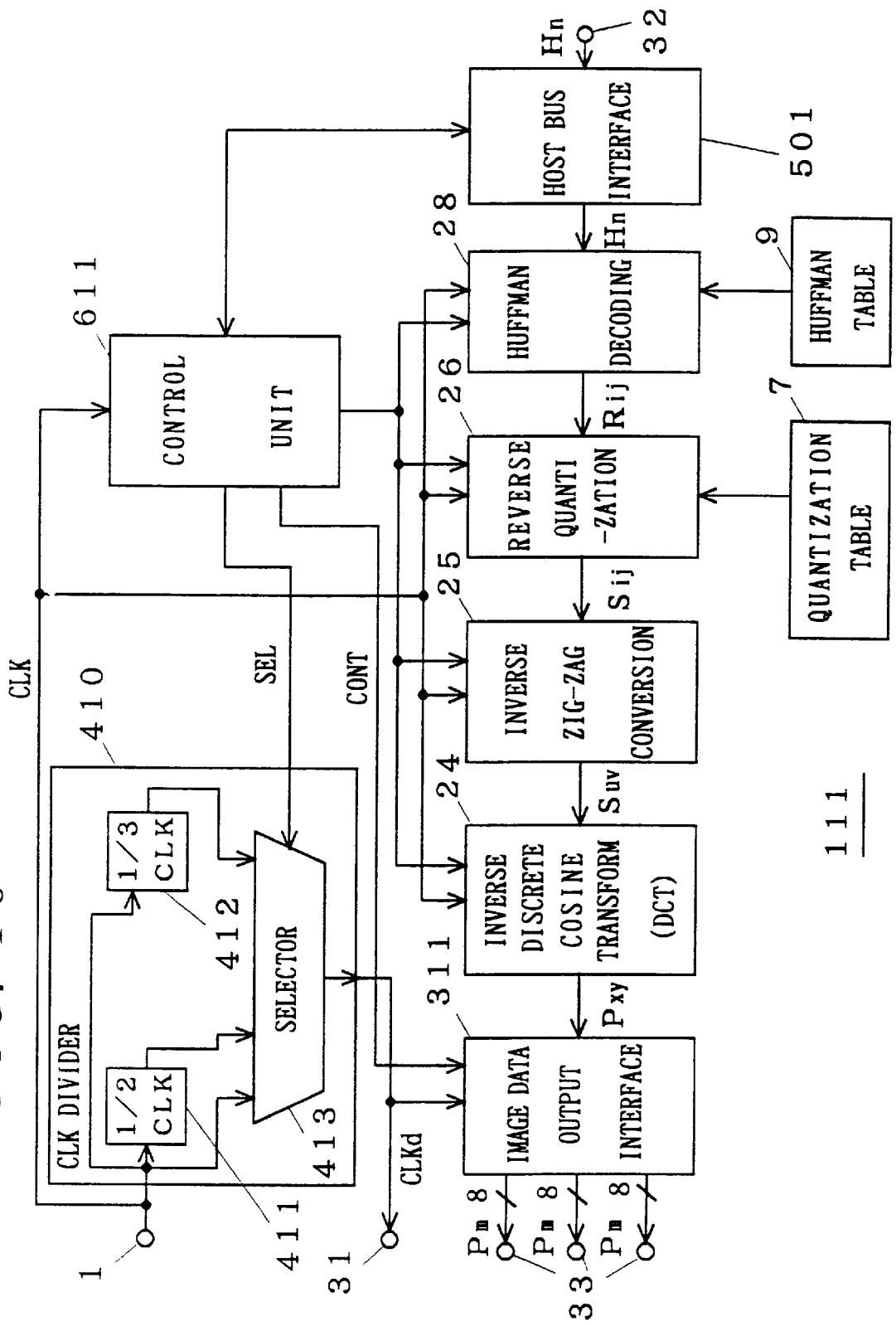
FIG. 10 is a block diagram of an image expansion device according to the third preferred embodiment of the present invention.

FIG. 10 is a block diagram showing the structure of an image expansion device which forms a pair with the image compression device 100 of the first preferred embodiment. In this image expansion device 111, the coded signals Hn (n=0, 1, . . . ) are sequentially subjected to operations the same as those in the conventional device shown in FIG. 17 in synchronization with the clock signal CLK to be reconstructed into the picture signals Pxy (x, y=0 to 7). The reconstructed picture signals Pxy are sequentially inputted to an image data outpult interface 311 in synchronization with the clock signal CLK.

Figure 11:
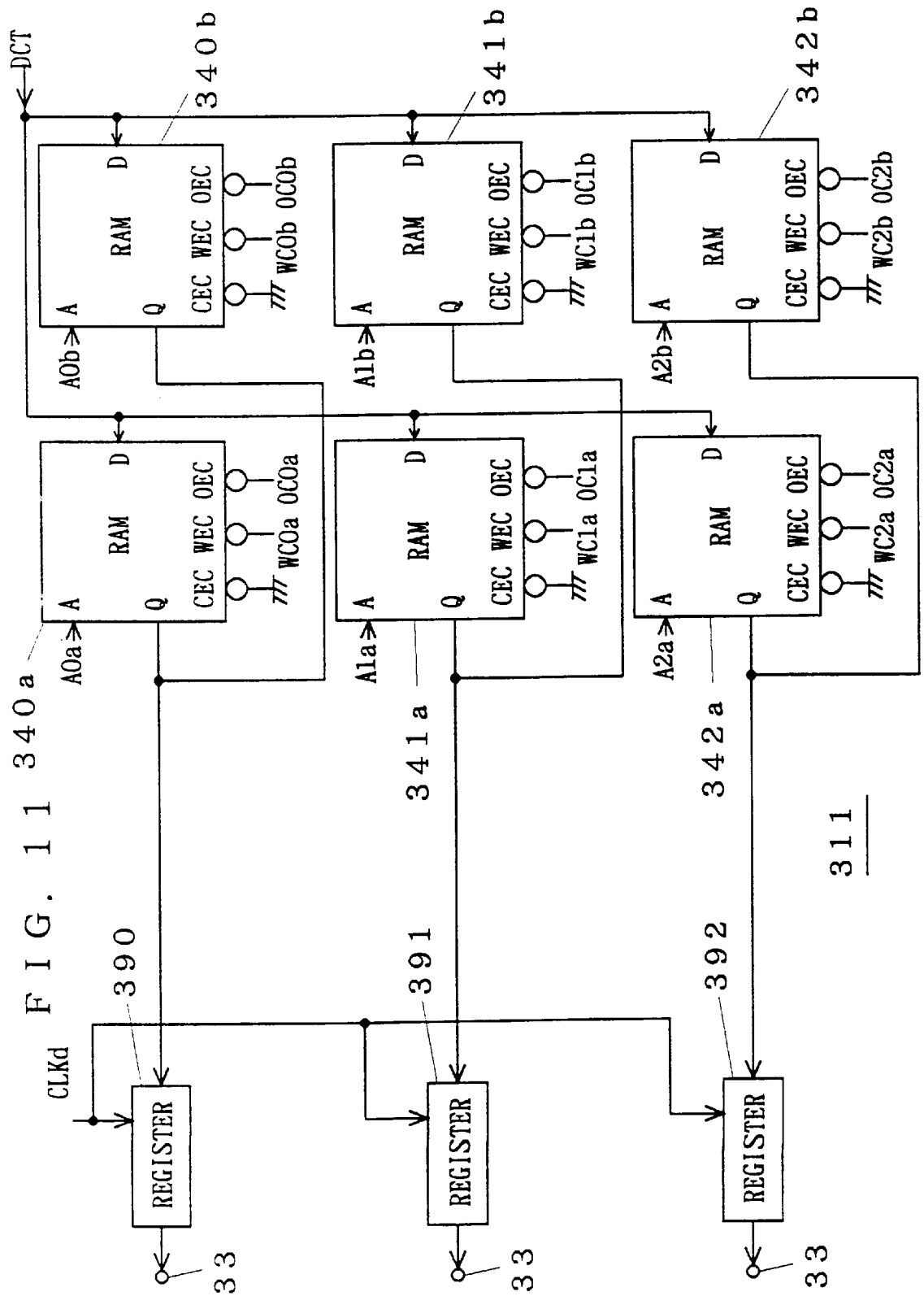
FIG. 11 is a block diagram of the image data output interface according to the third preferred embodiment of the present invention.

FIG. 11 shows an internal block diagram of the image data output interface 311. As shown in FIG. 11, the image data output interface 311 is configured as if inputs and outputs are exchanged in the image data input interface 310 shown in FIG. 5. The control signal CONT sent out from a control unit 611 is provided at the same timing as in the image data input interface 310 as to the address signals A0a–A2a, A0b–A2b, and it is provided at a timing opposite to the signals in the image data input interface 310 as to the write permission signals WC0a–WC2a, WC0b–WC2b and the read permission signals OC0a–OC2a, OC0b–OC2b.

As the image data output interface 311 is formed as described above and the control signals are provided at such timings, the image data output interface 311 performs operations opposite to those of the image data input interface 310. That is to say, the image data output interface 311 portions out the picture signals Pxy (x, y=0 to 7) inputted in synchronization with the clock signal CLK to picture signals Pm (m=0, 1, . . . , 63) which belongs to each of components and simultaneously outputs the picture signals Pm (m=0, 1, . . . , 63) which belong to the respective components in synchronization with the divided clock signal CLKd.

As discussed above, this image expansion device 111 can simultaneously output picture signals of three components while maintaining matching with operations of device units forming the decoder 201 such as the inverse discrete cosine transform unit 24 which operates in synchronization with the clock signal CLK. Further, the control unit 611 and the clock divider 410 work to select division value of the divided clock signal CLKd depending on the number of output components, so that it can simultaneously output picture signals which belong to desirable number of components in the range of 1 to 3 components while maintaining matching with operation of the decoder 201.

Also, the image expansion device 111 and the above-described image compression device 110 can be combined similarly to the device 102 shown in FIG. 4 to form an image conversion device capable of performing both compression and expansion.

5. Fourth Preferred Embodiment

Figure 12:
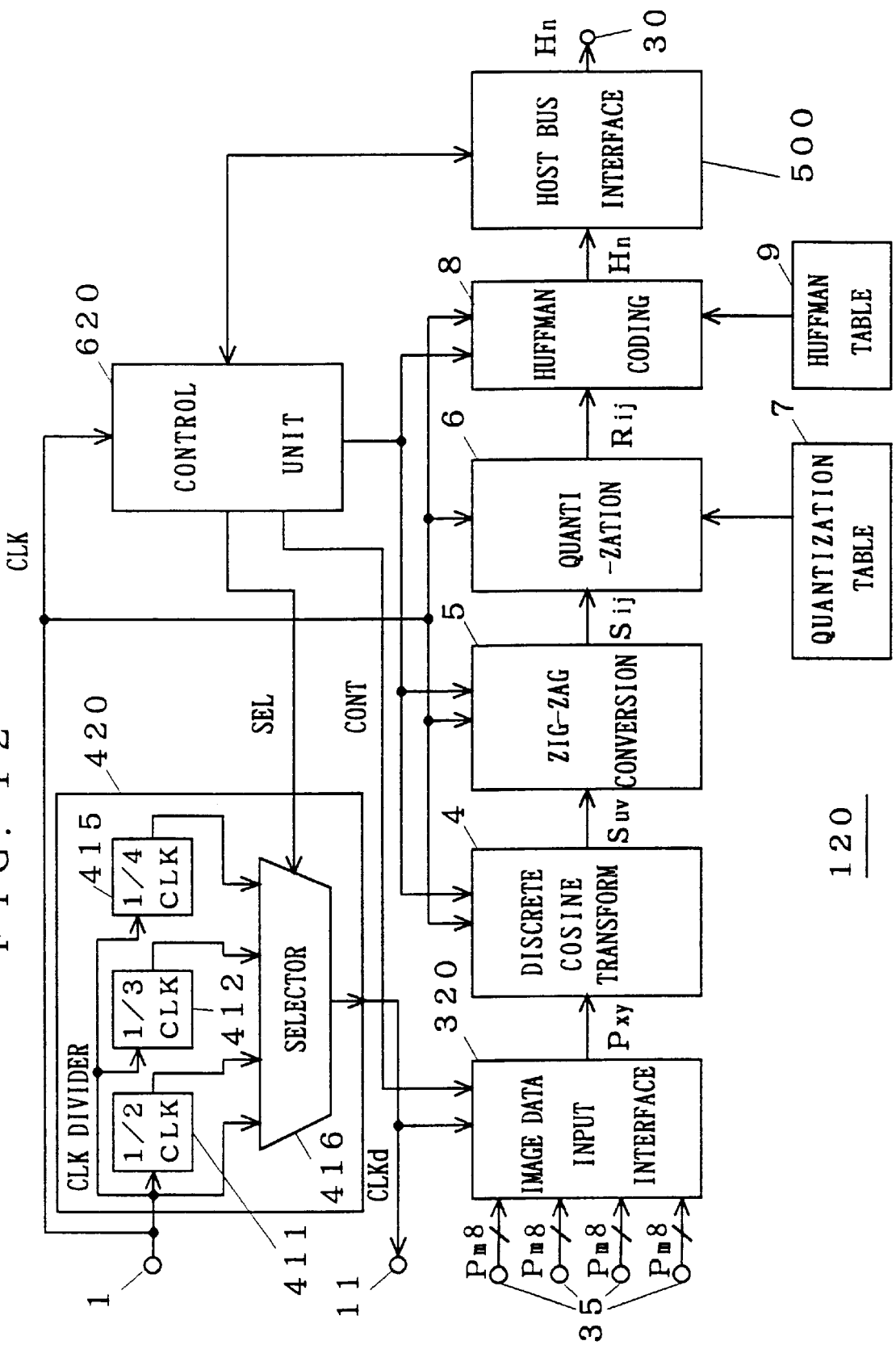
FIG. 12 is a block diagram of an image compression device according to the fourth preferred embodiment of the present invention.

FIG. 12 is a block diagram showing another example of an image compression device. This image compression device 120 is characteristically different from the image compression device 100 shown in FIG. 1 in that the maximum number of components which can be inputted to an image data input interface 320 is 4. Accordingly, a clock divider 420) further includes a ¼ divider 415, and a selector 416 selects one of the four kinds of clock signals on the basis of the selection signal SEL sent from a control unit 620 to provide it to the image data input interface 320 and the clock output terminal 11 as the divided clock signal CLKd.

Though not shown in the figure, the image data input interface 320 includes one register and two RAMs for each component similarly to the image data input interface 310 shown in FIG. 5. That is to say, the image data input interface 320 has such structure as the structure of the image data input interface 310 additionally provided with a register and RAMs for one more component.

As a result, picture signals which belong to desired number of components can be inputted at the same time in the range of 1 to 4 components while matching with operations of respective device units forming the encoder 200 such as the discrete cosine transform unit 4 is maintained. Also, as this image compression device 120 is capable of simultaneous input of four components, it is suitable for compression of picture signals of the YMCK calorimetric system, for example.

6. Fifth Preferred Embodiment

Figure 13:
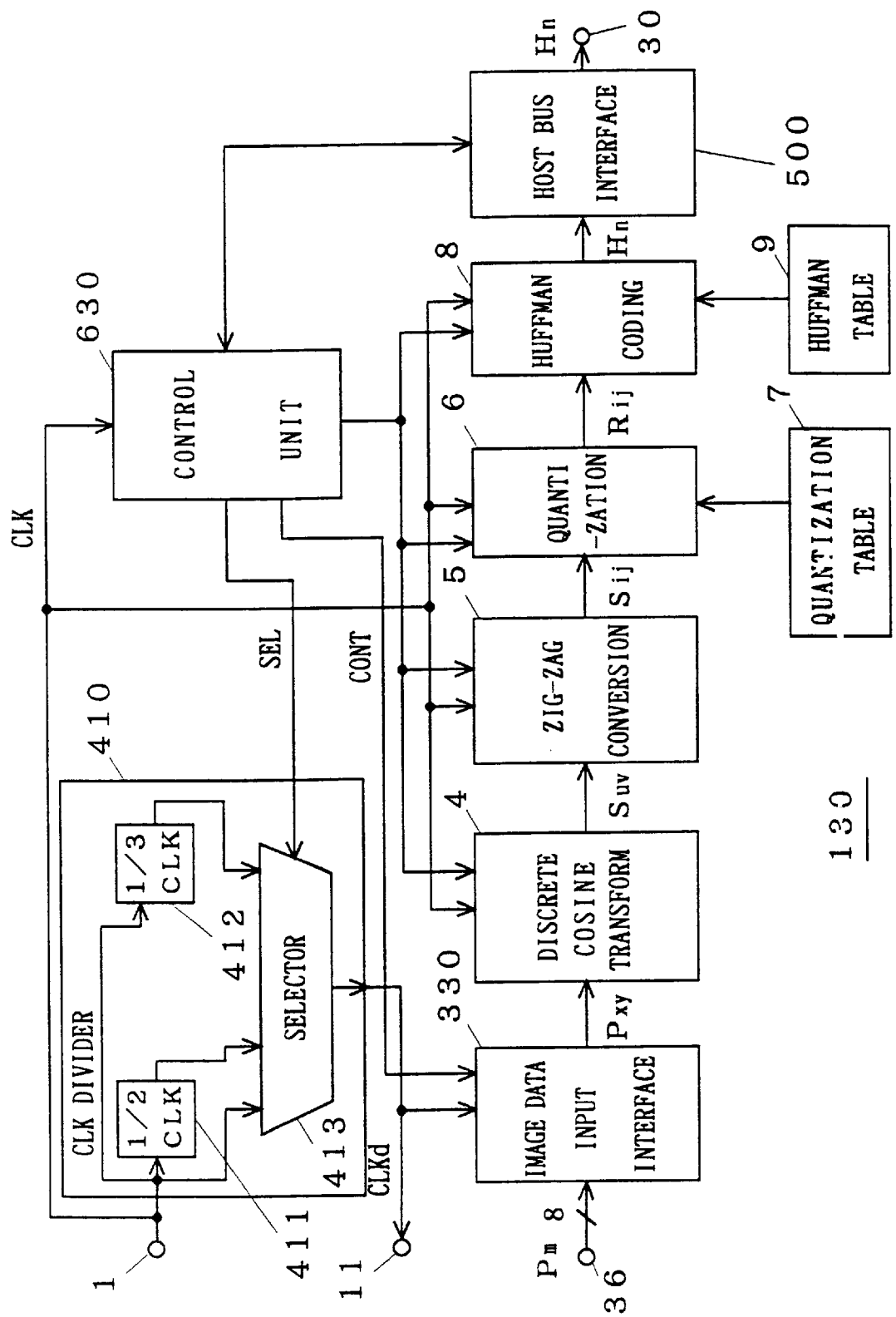
FIG. 13 is a block diagram of an image compression device according to the fifth preferred embodiment of the present invention.

FIG. 13 is a block diagram showing still another example of an image compression device. This image compression device 130 is characteristically different from the image compression device 100 shown in FIG. 1 in that the number of components capable of being input to an image data input interface 330 is fixed to 1. Though not shown in the figure, the image data input interface 330 includes those for only one component in the image data input interface 310 shown in FIG. 5.

This image compression device 130 is provided with a clock divider 410 configured in the same way as that of FIG. 1, where one of three kinds of clock signals is selected on the basis of the selection signal SEL sent from a control unit 630 and it is supplied to the image data input interface 330 as a divided clock signal CLKd. Accordingly, if the division value of the divided clock signal CLKd is selected to ½, for example, speed of input of picture signals to the image data input interface 330 can be slowed down by two times. If the division value of the divided clock signal CLKd is selected to ⅓, the speed of input of picture signals to the image data input interface 330 can be slowed down by three times.

When the division value of the divided clock signal CLKd is ½, a quiescent period equivalent to the operation period occurs every time picture signals for one block are processed in the device units forming the encoder 200 such as the discrete cosine transform unit 4, and when the division value of the divided clock signal CLKd is ⅓, a quiescent period two times as long as the operation period occurs. However, coding process is normally performed in each operation period.

That is to say, in the case where the speed of sending picture signals in the external device connected to the image data input terminal 36 is two or three times slower than in the image compression device, operation of the external device and operation of the image compression device match without requiring an additional interface therebetween. Further, in this image compression device 130, as the control unit 630 sends the selection signal SEL corresponding to the speed of sending the picture signals in the external device to adequately select one of plural kinds of periods of the divided clock signals CLKd, it is advantageous in that connection can be made easily with external devices with various speeds.

7. Sixth Preferred Embodiment

Figure 14:
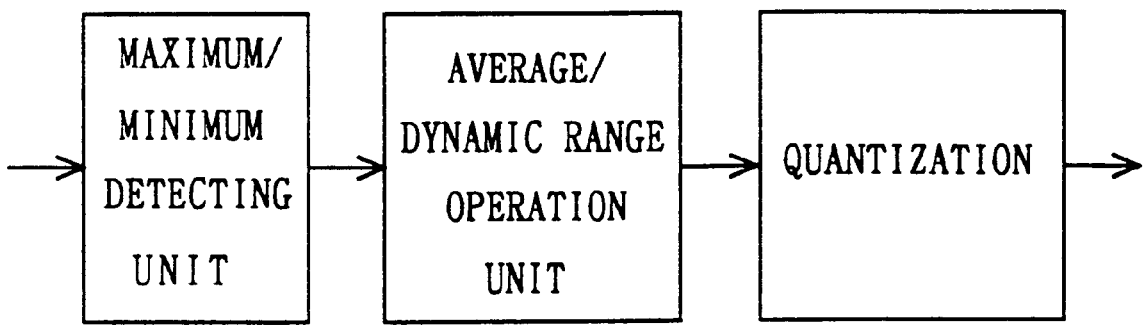
FIG. 14 is a block diagram of an encoder according to the sixth preferred embodiment of the present invention.

In FIG. 14, the encoder 200 in the image compression device 100 may be constructed to perform coding based on other algorithms in place of performing the coding based on the JPEG algorithm. For example, it may be constructed on the basis of the FBTC (Fixed Block Truncation Coding), of which structure is briefly shown in the block diagram of FIG. 14. Detailed description of this algorithm is not given herein because this algorithm itself is well known.

Figure 15:
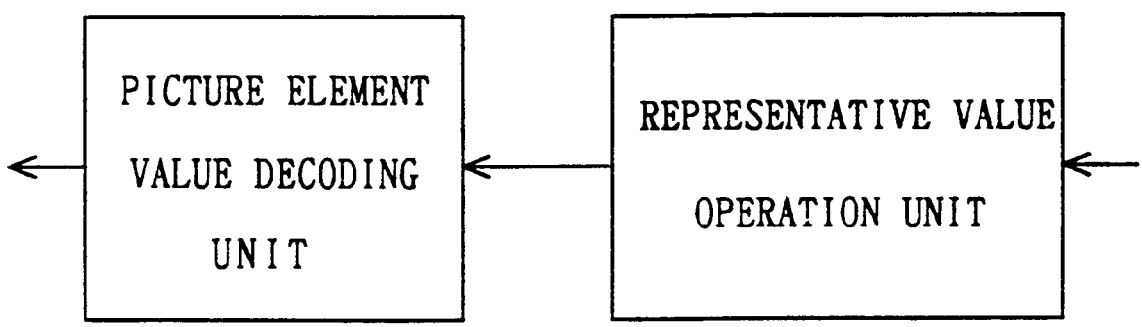
FIG. 15 is a block diagram of a decoder according to the sixth preferred embodiment of the present invention.

As a matter of fact, the decoder 201 in the image expansion device 101 may be constructed so as to perform coding other than the JPEG algorithm. For example, as roughly shown in the block diagram of FIG. 15, a decoder may be formed which makes a pair with the encoder shown in FIG. 14 on the basis of the FBTC.

While the invention has been shown and described in detail, the foregoing description is in all aspects illustrative and not restrictive. It is therefore understood that numerous modifications and variations can be devised without departing the scope of the invention.

What is claimed is:

1. The image conversion device for coding a series of picture signals representing an image using a number of components, said series of picture signals being partitioned into at least one block, the image conversion device comprising:

dividing means for dividing a clock signal received from an exterior of the image conversion device to produce a divided clock signal having a period which is longer than a period of the clock signal;

interface means for receiving said picture signals as inputs in synchronization with said divided clock signal produced by said dividing means and for sequentially outputting said picture signals in synchronization with said clock signal; and coding means for sequentially receiving as said picture signals outputted from said interface means and for converting said picture signals into coded signals in units of blocks, wherein said interface means comprises:

a receiver for simultaneously receiving plural components of the number of components equal in number to a ratio between the period of the divided clock signal and the period of the clock signal; and an output for sequentially outputting said picture signals to said coding means in synchronization with said clock signal, wherein said interface means further comprises:

first and second storage means for each of the components, each of said first and second storage means capable of being read from and written to and including a storage capacity for storing one block of one of the components of said picture signals, each of said first storage means and each of said second storage means alternately receiving a different one of the components simultaneously and in synchronization with said divided clock signal, said first and second storage means writing to said coding means alternately, in succession, and in synchronization with said clock signal, one of said first storage means writing to said coding means when each of said second storage means is being written to simultaneously and one of said second storage means writing to said coding means when each of said first storage means is being written to simultaneously.

2. The image conversion device according to claim 1, wherein each of said first and second storage means includes a plurality of unit storage means, and said picture signals for one block are stored over the plurality of unit storage means.

3. The image conversion device according to claim 1, wherein the number of the number of components is three, and wherein each of the number of components belongs to one component of a trichromatic system.

4. The image conversion device according to claim 1, wherein said coding means includes compression means for performing coding so that a size of said coded signals is smaller than a size of said picture signals.

5. The image conversion device according to claim 4, wherein said compression means performs coding according to a JPEG algorithm.

6. An image conversion device for coding a series of picture signals representing an image using a number of components, said series of picture signals being partitioned into at least one block, the image conversion device comprising:

dividing means for dividing a clock signal received from an exterior of the image conversion device to produce a divided clock signal having a period which is longer than a period of the clock signal;

interface means for receiving said picture signals as inputs in synchronization with said divided clock signal produced by said dividing means and for sequentially outputting said picture signals in synchronization with said clock signal; and coding means for sequentially receiving as said picture signals outputted from said interface means and for converting said picture signals into coded signals in units of blocks, wherein said interface means comprises:

- a receiver for simultaneously receiving plural components of the number of components equal in number to a ratio between the period of the divided clock signal and the period of the clock signal;
- an output for sequentially outputting said picture signals to said coding means in synchronization with said clock signal; and
- a control means for outputting a control signal to the dividing means, the control signal indicating the number of the number of components by which the clock signal is to be divided, the number of the number of components being a natural number greater than 2, wherein said dividing means comprises:

- a plurality of dividers smaller by one in number than the number of the number of components, said plurality of dividers said clock signal into a plurality of divided signals by dividing by natural numbers between two and the number of the number of components and outputting the plurality of divided signals; and
- signal selection means for selecting one of said plurality of divided signals based on said control signal and for outputting the selected one of the plurality of divided signals as said divided clock signal.

7. The image conversion device for decoding coded signals obtained by coding a series of picture signals representing an image coded using a number of components said series of picture signals being partitioned into at least one block, the image conversion device comprising:

decoding means for decoding and converting said coded signals into said picture signals in units of blocks and for sequentially outputting said picture signals in synchronization with a clock signal received from an exterior of the image conversion device;

dividing means for dividing said clock signal to produce a divided clock signal having a period which is longer than a period of the clock signal; and interface means receiving as inputs said picture signals sequentially output by said decoding means and outputting said picture signal in synchronization with said divided clock signal, wherein said interface means comprises interface means receiving as inputs said picture signals sequentially output by said decoding means and simultaneously outputting plural components of the number of components equal to a ratio between the period of the divided clock signal and the period of the clock signal in synchronization with said divided clock signal, wherein said interface means further comprises:

first and second storage means for each of the components, each of said first and second storage means capable of being read from and written to and including a storage capacity for storing one block of one of the components of said picture signals, each of said first storage means and each of said second storage means alternately outputting a different one of the components of said picture signals simultaneously and in synchronization with said divided clock signal, said first and second storage means being written to by said decoding means alternately, in succession and in synchronization with said clock signal, one of said first storage means being written to by said decoding means when each of said second storage means are outputting a corresponding one of the components simultaneously and one of said second storage means being written to by said decoding means when each of said first storage means are outputting the corresponding one of the components simultaneously.

8. The image conversion device of claim 7, wherein each of said first and second storage means includes a plurality of unit storage means, and said picture signals for one block are stored over the plurality of unit storage means.

9. The image conversion device according to claim 7, wherein the number of the number of components is three, and wherein each of the number of components belongs to one component of a trichromatic system.

10. The image conversion device according to claim 7, wherein said coded signal is a compressed signal having a size smaller than a size of said picture signal, and wherein said decoding means includes an expansion means for expanding said coded signal.

11. The image conversion device according to claim 10, wherein said expansion means performs decoding according to a JPEG algorithm.

12. An image conversion device for decoding coded signals obtained by coding a series of picture signals representing an image coded using a number of components, said series of picture signals being partitioned into at least one block the image conversion device comprising:

decoding means for decoding and converting said coded signals into said picture signals in units of blocks and for sequentially outputting said picture signals in synchronization with a clock signal received from an exterior of the image conversion device;

dividing means for dividing said clock signal to produce a divided clock signal having a period which is longer than a period of the clock signal; and interface means receiving as inputs said picture signals sequentially output by said decoding means and outputting said picture signal in synchronization with said divided clock signal; and a control means for outputting a control signal to the dividing means the control signal indicating the number of the number of components by which the clock signal is to be divided wherein the number of the number of components is a natural number greater than 2, wherein said interface means comprises interface means receiving as inputs said picture signals sequentially output by said decoding means and simultaneously outputting plural components of the number of components equal to a ratio between the period of the divided clock signal and the period of the clock signal in synchronization with said divided clock signal, and wherein said dividing means comprises:

a plurality of dividers smaller by one in number than the number of the number of components, said plurality of dividers dividing said clock signal into a plurality of divided signals by dividing by natural numbers between two and the number of the number of components and outputting the plurality of divided signals; and signal selection means for selecting one of said plurality of divided signals based on said control signal and for outputting the selected one of the plurality of divided signals as said divided clock signal.

13. The image conversion device capable of coding a series of picture signals, representing an image using a number of components, into coded signals and capable of decoding the coded signals into said picture signals, said picture signals being partitioned into at least one block, the image conversion device comprising:

dividing means for dividing a clock signal received from an exterior of the image conversion device to produce a divided clock signal having a period which is longer than a period of the clock signal;

first interface means for receiving said picture signals as inputs, in synchronization with said divided clock signal produced by. said dividing means, and for sequentially outputting said picture signals in synchronization with said clock signal;

coding means for sequentially receiving as inputs said picture signals outputted from said interface means and for converting said picture signals into said coded signals in units of blocks;

decoding means for decoding and converting said coded signals into said picture signals in said units of blocks and for sequentially outputting said picture signals in synchronization with said clock signal; and second interface means for sequentially receiving as inputs said picture signals outputted from said decoding means and outputting said picture signals in synchronization with said divided clock signal wherein:

the first interface device comprises a receiver for simultaneously receiving plural components of the number of components equal in number to a ratio between the period of the divided clock signal and the period of the clock signal; and the second interface device comprises an output device for simultaneously outputting the portion of the number of components equal in number to the ratio, wherein said first interface means comprises:

first and second storage means for each of the components, each of said first and second storage means capable of being read from and written to and including a storage capacity for storing one block of one of the components of said picture signals, each of said first storage means and each of said second storage means alternately receiving a different one of the components of said picture signals simultaneously and in synchronization with said divided clock signal, said first and second storage means writing to said coding means alternately, in succession, and, in synchronization with said clock signal, one of said first storage means writing to said coding means when each of said second storage means is being written to simultaneously and one of said second storage means writing to said coding means when each of said first storage means is being written to simultaneously; and wherein said second interface means comprises:

third and fourth storage means for each of the components, each of said third and fourth storage means capable of being read from and written to and including a storage capacity storing one block of one of the components of said picture signals, each of said third storage means and each of said fourth storage means alternately outputting a corresponding one of the components of said picture signals simultaneously and in synchronization with said divided clock signal, said third and fourth storage means being written to alternately and in succession by said decoding means in synchronization with said clock signal, one of said third storage means being written to by said decoding means when each of said fourth storage means is simultaneously outputting a corresponding one of the components, and one of said fourth storage means being written to by said decoding means when each of said third storage means is simultaneously outputting a corresponding one of the components.

14. The image conversion device according to claim 13, wherein each of said first and second storage means includes a plurality of unit storage means, and said picture signals for one block are stored over the plurality of unit storage means.

15. The image conversion device according to claim 13, wherein each of said third and fourth storage means includes a plurality of unit storage means, and said picture signals for one block are stored over the plurality of unit storage means.

16. The image conversion device according to claim 13, wherein the number of the number of components is three, and wherein each of the number of components belongs to one component of a trichromatic system.

17. The image conversion device according to claim 13, wherein said coding means includes compression means for performing coding so that a size of said coded signals is smaller than a size of said picture signals, and said decoding means includes expansion means for expanding said coded signals.

18. The image conversion device according to claim 17, wherein said compression means performs coding according to a JPEG algorithm, and said expansion means performs decoding according to the JPEG algorithm.

19. An image conversion device capable of coding a series of picture signals, representing an image using a number of components, into coded signals and capable of decoding the coded signals into said picture signals, said picture signals being partitioned into at least one block, the image conversion device comprising:

dividing means for dividing a clock signal received from an exterior of the image conversion device to produce a divided clock signal having a period which is longer than a period of the clock signal;

first interface means for receiving said picture signals as inputs, in synchronization with said divided clock signal produced by said dividing means, and for sequentially outputting said picture signals in synchronization with said clock signal;

coding means for sequentially receiving as inputs said picture signals outputted from said interface means and for converting said picture signals into said coded signals in units of blocks;

decoding means for decoding and converting said coded signals into said picture signals in said units of blocks and for sequentially outputting said picture signals in synchronization with said clock signal; and second interface means for sequentially receiving as inputs said picture signals outputted from said decoding means and outputting said picture signals in synchronization with said divided clock signal wherein:

the first interface device comprises a receiver for simultaneously receiving plural components of the number of components equal in number to a ratio between the period of the divided clock signal and the period of the clock signal;

the second interface device comprises an output device for simultaneously outputting the portion of the number of components equal in number to the ratio; and a control means for outputting a control signal to the dividing means, the control signal indicating the number of the number of components by which the clock signal is to be divided wherein the number of the number of components is a natural number greater than 2, wherein said dividing means comprises:

a plurality of dividers smaller by one in number than the number of the number of the components, said plurality of dividers dividing said clock signal into a plurality of divided signals by dividing by natural numbers between two and the number of the number of components and outputting said plurality of divided signals; and signal selection means for selecting one of said plurality of divided signals based on said control signal and for outputting the selected one of the plurality of divided signals as said divided clock signal.

20. The image conversion device for coding a series of picture signals representing an image using a number of components, said series of picture signals being partitioned into at least one block, the image conversion device comprising:

dividing means for dividing a clock signal received from an exterior of the image conversion device to produce a divided clock signal having a period which is longer than a period of the clock signal;

interface means for receiving said picture signals as inputs in synchronization with said divided clock signal produced by said dividing means, and for sequentially outputting said picture signals in synchronization with said clock signal; and coding means for sequentially receiving as said picture signals outputted from said interface means and for converting said picture signals into coded signals in units of blocks, wherein said interface means comprises:

a receiver for simultaneously receiving plural components of the number of components equal in number to a ratio between the period of the divided clock signal and the period of the clock signal; and an output for sequentially outputting said picture signals to said coding means in synchronization with said clock signal, wherein said interface means further comprises:

first and second memories for each of the components, each of said first and second memories capable of being read from and written to and including a storage capacity for storing one block of one of the components of said picture signals, each of said first memories and each of said second memories alternately receiving a different one of the components simultaneously and in synchronization with said divided clock signal, said first and second memories writing to said coding means alternately, in succession, and in synchronization with said clock signal, one of said first memories writing to said coding means when each of said second memories is being written to simultaneously and one of said second memories writing to said coding means when each of said first memories is being written to simultaneously.

21. The image conversion device for decoding coded signals obtained by coding a series of picture signals representing an image coded using a number of components, said series of picture signals being partitioned into at least one block, the image conversion device comprising:

decoding means for decoding and converting said coded signals into said picture signals in units of blocks and for sequentially outputting said picture signals in synchronization with a clock signal received from an exterior of the image conversion device, dividing means for dividing said clock signal to produce a divided clock signal having a period which is longer than a period of the clock signal; and interface means receiving as inputs said picture signals sequentially output by said decoding means and outputting said picture signal in synchronization with said divided clock signal, wherein said interface means comprises interface means receiving as inputs said picture signals sequentially output by said decoding means and simultaneously outputting plural components of the number of components equal to a ratio between the period of the divided clock signal and the period of the clock signal in synchronization with said divided clock signal, wherein said interface means further comprises:

first and second memories for each of the components, each of said first and second memories capable of being read from and written to and including a storage capacity for storing one block of one of the components of said picture signals, each of said first memories and each of said second memories alternately outputting a different one of the components of said picture signals simultaneously and in synchronization with said divided clock signal, said first and second memories being written to by said decoding means alternately, in succession and in synchronization with said clock signal, one of said first memories being written to by said decoding means when each of said second memories are outputting a corresponding one of the components simultaneously and one of said second memories being written to by said decoding means when each of said first memories are outputting the corresponding one of the components simultaneously.

22. The image conversion device capable of coding a series of picture signals, representing an image using a number of components, into coded signals and capable of decoding the coded signals into said picture signals, said picture signals being partitioned into at least one block, the image conversion device comprising:

dividing means for dividing a clock signal received from an exterior of the image conversion device to produce a divided clock signal having a period which is longer than a period of the clock signal;

first interface means for receiving said picture signals as inputs, in synchronization with said divided clock signal produced by said dividing means, and for sequentially outputting said picture signals in synchronization with said clock signal;

coding means for sequentially receiving as inputs said picture signals outputted from said interface means and for converting said picture signals into said coded signals in units of blocks;

decoding means for decoding and converting said coded signals into said picture signals in said units of blocks and for sequentially outputting said picture signals in synchronization with said clock signal; and second interface means for sequentially receiving as inputs said picture signals outputted from said decoding means and outputting said picture signals in synchronization with said divided clock signal wherein:

the first interface device comprises a receiver for simultaneously receiving plural components of the number of components equal in number to a ratio between the period of the divided clock signal and the period of the clock signal; and the second interface device comprises an output device for simultaneously outputting the portion of the number of components equal in number to the ratio, wherein said first interface means comprises:

first and second memories for each of the components, each of said first and second memories capable of being read from and written to and including a storage capacity for storing one block of one of the components of said picture signals, each of said first memories and each of said second memories alternately receiving a different one of the components of said picture signals simultaneously and in synchronization with said divided clock signal, said first and second memories writing to said coding means alternately, in succession, and, in synchronization with said clock signal, one of said first memories writing to said coding means when each of said second memories is being written to simultaneously and one of said second memories writing to said coding means when each of said first memories is being written to simultaneously; and wherein said second interface means comprises:

third and fourth memories for each of the components, each of said third and fourth memories capable of being read from and written to and including a storage capacity storing one block of one of the components of said picture signals, each of said third memories and each of said fourth memories alternately outputting a corresponding one of the components of said picture signals simultaneously and in synchronization with said divided clock signal, said third and fourth memories being written to alternately and in succession by said decoding means in synchronization with said clock signal, one of said third memories being written to by said decoding means when each of said fourth memories is simultaneously outputting a corresponding one of the components, and one of said fourth memories being written to by said decoding means when each of said third memories is simultaneously outputting a corresponding one of the components.

* * * * *